United States Patent
Roulet et al.

(10) Patent No.: US 12,333,693 B2
(45) Date of Patent: *Jun. 17, 2025

(54) METHOD FOR OPTIMAL BODY OR FACE PROTECTION WITH ADAPTIVE DEWARPING BASED ON CONTEXT SEGMENTATION LAYERS

(71) Applicant: ImmerVision, Inc., Montreal (CA)

(72) Inventors: Patrice Roulet, Montreal (CA); Pierre Konen, Saint-Bruno (CA); Jocelyn Parent, Lavaltrie (CA); Simon Thibault, Quebec City (CA); Xavier Dallaire, Verdun (CA); Xiaojun Du, Montreal (CA); Ebrahim Mortazy, Verdun (CA)

(73) Assignee: IMMERVISION, INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,358

(22) Filed: Oct. 16, 2023

(65) Prior Publication Data
US 2024/0037719 A1 Feb. 1, 2024

Related U.S. Application Data

(63) Continuation of application No. 17/903,270, filed on Sep. 6, 2022, now Pat. No. 11,790,495, which is a
(Continued)

(51) Int. Cl.
*G06T 5/80* (2024.01)
*G06T 3/60* (2006.01)
(Continued)

(52) U.S. Cl.
CPC .................. *G06T 5/80* (2024.01); *G06T 3/60* (2013.01); *G06T 5/50* (2013.01); *G06T 5/77* (2024.01);
(Continued)

(58) Field of Classification Search
USPC ................................................. 382/254, 275
See application file for complete search history.

(56) References Cited

U.S. PATENT DOCUMENTS 10,204,398 B2  2/2019  Roulet et al.
10,356,316 B2  7/2019  Artonne
(Continued)

FOREIGN PATENT DOCUMENTS

CN    105450900 A    3/2016
JP    2008252856 A   10/2008

OTHER PUBLICATIONS

Lee et al., Scene Warping: Layer Based Stereoscopic Image Resizing, 2012 IEEE 978-1-4673-1228, pp. 49-56. (Year: 2012).*
(Continued)

*Primary Examiner* — Ishrat I Sherali
(74) *Attorney, Agent, or Firm* — Panitch Schwarze Belisario & Nadel LLP

(57) ABSTRACT

A method for enhancing a wide angle image to improve the perspectives and the visual appeal thereof wide-angle images uses custom adaptive dewarping. The method is based on the scene image content of recognized objects in the image, the position of these objects in the image, the depth of these objects in the scene with respect to other objects and the general context of the image.

20 Claims, 12 Drawing Sheets

Related U.S. Application Data continuation of application No. 16/898,501, filed on Jun. 11, 2020, now Pat. No. 11,475,546.

(60) Provisional application No. 62/859,861, filed on Jun. 11, 2019.

(51) Int. Cl.
| | | |
|---|---|---|
| *G06T 5/50* | (2006.01) | |
| *G06T 5/77* | (2024.01) | |
| *G06T 7/194* | (2017.01) | |
| *G06T 7/50* | (2017.01) | |
| *H04N 23/698* | (2023.01) | |

(52) U.S. Cl.
CPC ............... *G06T 7/194* (2017.01); *G06T 7/50* (2017.01); *H04N 23/698* (2023.01); *G06T 2207/20084* (2013.01)

(56) References Cited

U.S. PATENT DOCUMENTS

| | | |
|---|---|---|
| 10,503,966 B1 | 12/2019 | Pan |
| 10,572,982 B2 | 2/2020 | Beric et al. |
| 10,694,102 B2 | 6/2020 | Roulet et al. |
| 11,049,218 B2 | 6/2021 | Khwaja et al. |
| 11,087,435 B1 * | 8/2021 | Vivona .................... G06T 3/12 |
| 11,475,546 B2 * | 10/2022 | Roulet .................... G06T 3/18 |
| 11,790,495 B2 * | 10/2023 | Roulet .................... G06T 7/50 |
| | | 382/275 |
| 2014/0267610 A1 * | 9/2014 | Ahmad .................. G06T 19/00 |
| | | 348/46 |
| 2015/0116370 A1 | 4/2015 | Fan Jiang |
| 2015/0281507 A1 | 10/2015 | Konen et al. |
| 2016/0110848 A1 | 4/2016 | Gray et al. |
| 2018/0027181 A1 * | 1/2018 | Roulet .................... G06T 5/70 |
| | | 348/38 |
| 2018/0146137 A1 * | 5/2018 | Roulet .................. G03B 37/00 |
| 2018/0278918 A1 * | 9/2018 | Peri ...................... H04N 23/698 |
| 2019/0102868 A1 * | 4/2019 | Beric ...................... G06T 5/80 |

OTHER PUBLICATIONS

Int'l Preliminary Report on Patentability issued Dec. 14, 2021 in Int'l Application No. PCT/IB2020/055495.

Int'l Search Report and Written Opinion issued Sep. 1, 2020 in Int'l Application No. PCT/IB2020/055495.

Lee et al., Scene Warping: Layer-based Stereoscopic Image Resizing, 2012 IEE 978-1-4673-1228-8/12, pp. 49-56, 2012.

Office Action issued Jan. 9, 2023 in U.S. Appl. No. 17/903,270.

* cited by examiner

METHOD FOR OPTIMAL BODY OR FACE PROTECTION WITH ADAPTIVE DEWARPING BASED ON CONTEXT SEGMENTATION LAYERS

CROSS-REFERENCE TO RELATED APPLICATIONS

The present application is a continuation application of U.S. patent application Ser. No. 17/903,270, filed on Sep. 6, 2022, entitled "Method for Optimal Body or Face Protection with Adaptive Dewarping Based on Context Segmentation Layers," which is a continuation application of U.S. patent application Ser. No. 16/898,501, filed on Jun. 11, 2020, entitled "Method for Optimal Body or Face Protection with Adaptive Dewarping Based on Context Segmentation Layers," now U.S. Pat. No. 11,475,546, which claims the benefit of U.S. Provisional Patent Application No. 62/859,861, filed on Jun. 11, 2019, entitled "Method for Adaptive Dewarping Based on Context Segmentation Layers," the entire contents of all of which are incorporated by reference herein.

BACKGROUND OF THE INVENTION

Embodiments of the present invention relate to the field of photography and more specifically on how image distortion in wide-angle images can be corrected differently depending on the image context, the segmentation layers and/or the depth of objects visible in the image.

In photography, with narrow-angle lenses having full field of view under 60°, it is generally desirable to have images in which the straight lines in the objects remain straight. This is achieved by having images following as closely as possible the rectilinear $H=f*\tan(\theta)$ relation between the image height H and the field angle $\theta$, which remain doable in narrow-angle lenses. With a quite limited full field of view below 60°, this type rectilinear $H=f*\tan(\theta)$ relation do not impact significantly the object proportion on periphery of the image. The images following exactly this relation are said to be without optical distortion. For optical lenses that do not follow exactly this relation for all field angle $\theta$, the resulting image from these lenses are said to have some optical distortion. This optical distortion is especially present in wide-angle images having full field of view over 60°. Correcting the residual image distortion of wide-angle image or modifying it on purpose are known techniques in image processing that are often used when the optical lens itself cannot be designed to create the desired projection for the desired application.

While the rectilinear projection is ideal to keep the straight lines of the object straight in the image, it is sometime not the projection creating the most visually pleasing images in photography. One such example is the group selfie, or groupie, with wide-angle lenses in which people are located at various positions of the field of view. The people in the center appears with normal proportions, but the people toward the edges appear stretched and deformed because of the rapidly increasing number of pixels/degree of this projection. This unpleasant visual effect on human faces is not only visible in lenses with a rectilinear projection, but in every lens not specifically designed to keep the proportions visually pleasing.

Some image processing algorithm or some lenses are designed specially to limit this undesirable effect toward the edges by limiting the rapidly increasing number of pixels/degree toward the edge at the expense of creating curved lines. In other words, even with perfect calibration of the lens and the dewarping algorithm, the dewarping algorithm will only be able to correct either straight lines or the faces proportions since these two corrections require different dewarping projections. If the correction algorithm is optimized to offer more visually pleasing images of human located toward the edges of wide-angle images, a process called body and face protection, they will have the undesirable consequence of doing so by adding geometrical distortion in the images and the resulting images will have curved lines even if the original object scene consist of straight lines. On the opposite, if the correction algorithm is optimized to straighten the lines in the image, it will worsen the proportions of human located toward the edges.

For example, the image distortion transformation method presented in U.S. Pat. No. 10,204,398 B2 is used to transform images the distortion from an original image from an imager to a transformed image in which the distortion of the image is modified according to a pre-configured or a selected target image distortion profile. Even if this target distortion profile can be asymmetric, for example to maintain a similar field of view, this target distortion profile is however applied to the whole image without consideration for the position of objects in the image or their depth. As such, when using this method, one can improve the appearance of straight lines while worsening the appearance of people in the image or the opposite.

Some other existing warped image geometries corrections method already exists, like perspective tilt correction with the horizon as presented in U.S. Pat. No. 10,356,316 B2. However, these methods can only correct the perspective for the whole image and cannot apply the correction to a specific element.

Another issue to overcome is the fact that real lenses from a mass production batch all differ slightly from each other due to tolerancing error on the shape, position or orientation of each optical elements. These tolerancing error create slightly different distortion profile for each lens of a mass production batch and so residual geometrical distortion can be present in the images even after dewarping the image based on the theoretical distortion curve for this mass-produced lens.

In order to have body and face protection, that is having the most visually appealing human proportions, while still making the straight lines in the object appear as straight lines in the images, some more advanced image processing algorithms exist, applying a specific image dewarping depending on the content of the image. However, when applying a correction for a foreground object or person, these algorithms have the undesirable consequence of breaking the perspectives in the background. A new method is required to overcome all these issues.

BRIEF SUMMARY OF THE INVENTION

To overcome all the previously mentioned issues, embodiments of the present invention present a method of adaptive dewarping to apply different dewarping algorithm based on scene context, position of the object and/or depth of objects present in the image. From an initial input image, the method first applies an image segmentation process to separate the various objects visible in the original image. Then, the depth of each object is used to order all the objects by layers according to their object type and their depth with respect to the camera. The depth value used to separate the layers is either an absolute depth measurement or a relative depth between the objects and can be calculated using an artificial intelligence neural network trained to infer the depth from 2D images, from parallax calculation using a pair of stereo images, from a depth measurement specific device like a time of flight sensor, structured light systems, lidar, radar, 3D capture sensor or the likes. Each category of object that is recognized in the original image will be dewarped using a specific dewarping algorithm or projection. For example, if human faces are detected in the original images, a specific dewarping algorithm to avoid stretching the human faces and make them more visually appealing will be used on the humans, a process called face protection. If the same original image also contains buildings, the adaptive dewarping algorithm will apply a different dewarping on the building to keep the lines straight. There is no limit according to the present invention to the types of objects that can be recognized by the adaptive dewarping method and to the dewarping to be applied on them. The dewarping to apply can be defined in advance as a preset for a specific object type, e.g human face, building, etc. or can be calculated to respect object well-known characteristics such as face proportions, human body proportions, etc. This method is applied on each segmented layer and depth layer, including for the background layer. The background layer consists of objects far from the camera and not having a preset distortion dewarping. In preferred embodiments according to the present invention, the background is dewarped in order to keep the perspective of the scene undistorted. Compared to existing prior art, the adaptive method allows to apply a different dewarping to each kind of object based on type, layer, depth, size, texture, etc.

In some cases, when deforming a given layer, the adaptive dewarping can create a region of missing information in a layer behind because the layer behind is applied a different dewarping. Only when this happen, an additional image completion step can be applied on the resulting image to further make it more visually appealing. This image completion step consists of separating the objects after adaptive dewarping based on context in several depth layers. Some depth layers have missing information and some other depth layer are without any missing information. A completion algorithm is then used on the layers with missing information in order to fill the region with missing information. This can be done by applying a blur based on the texture and color surrounding the missing information zone, applying a gradient line that gradually change the color from the color on one side to the color on the other side of the missing information region, using an artificial intelligence network trained to complete the missing information of pictures or the likes. The completion algorithm output completed depth layers that can then be merged back in a single image with filled information in which the perspective corrections were applied, the people shapes were corrected avoid unpleasant stretching and the missing background information was filled with the completion algorithm.

In some embodiments according to the present invention, the dewarping projection for the background layer depend on the context identified in the foreground objects.

In some embodiments according to the present invention, the adaptive dewarping method is used to either maximize the straightness of the lines in the images compared to the original lines in the object scene, maximize the output image full field of view compared to the original image full field of view and/or maximize the conservation of the proportions in the output image compared to the real proportions in the object scene.

In some embodiments according to the present invention, instead of completing the missing information with a completion algorithm, the relative magnification of front layers is increased to cover the regions of missing information in layers behind. In certain case, this technique might make front objects appear bigger or closer than they were used to be in the original image.

In some embodiments according to the present invention, the selection of the dewarping projection for a background layer depend on the detected context of an original wide-angle image.

In some embodiments according to the present invention, the processing includes creating a virtual camera centered on the element having the warped geometry, applying a rectilinear correction on the virtual camera and translating the result to a correct location in the final image.

In some embodiments according to the present invention, the method for adaptive dewarping based on context and segmentation layers include processing done by a processor inside a physical device also creating the original wide-angle image with an imager and displaying the final image to a display screen.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
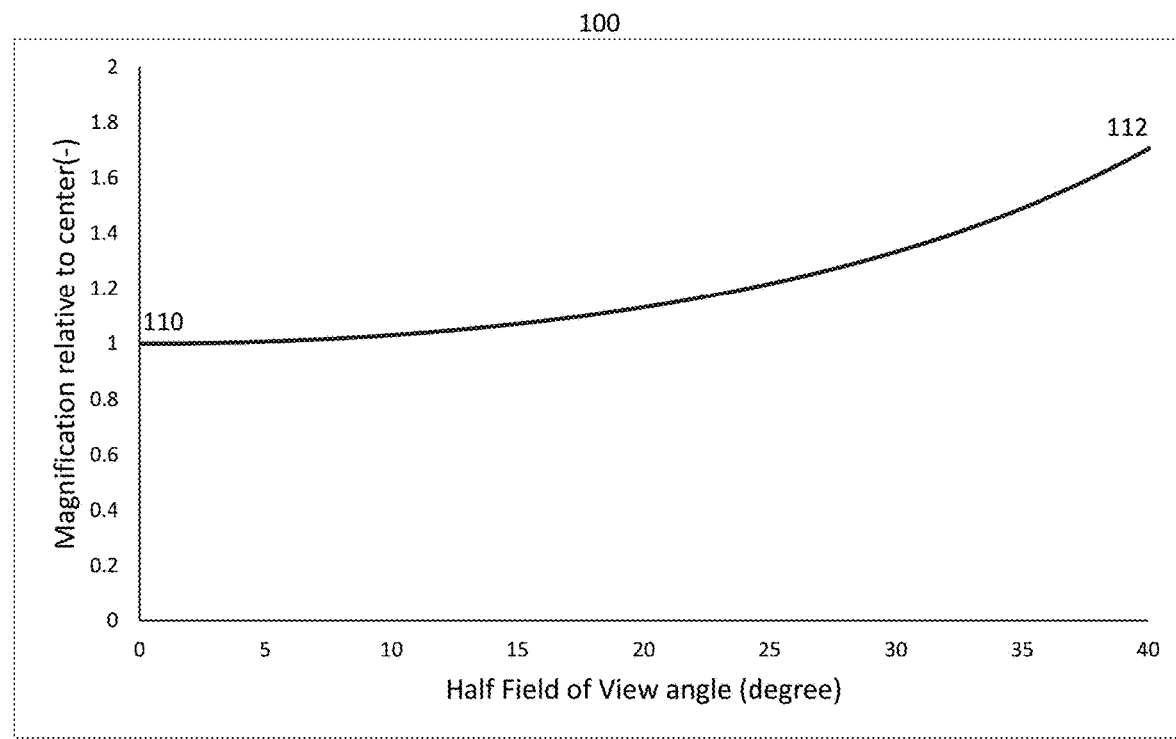
FIG. 1 shows the resolution curve of a rectilinear image.
Figure 1:
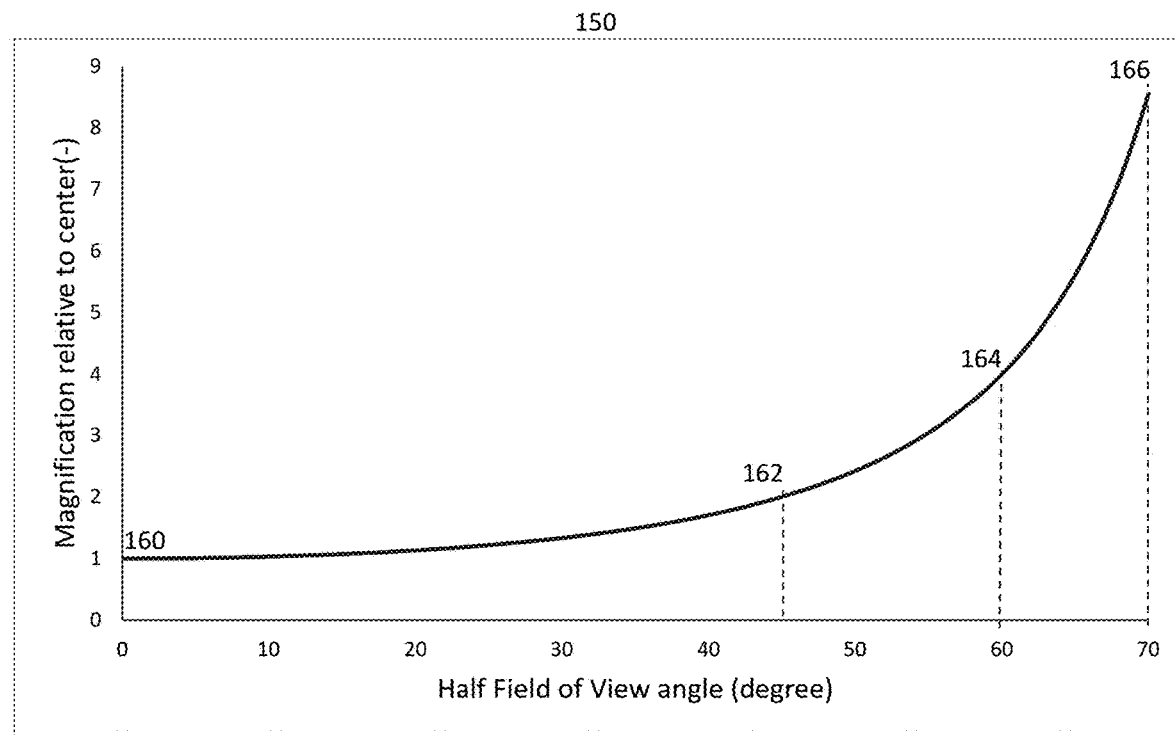

Certain terminology is used in the following description for convenience only and is not limiting. The words "right", "left", "bottom", and "top" designate directions in the drawings to which reference is made. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

FIG. 1 shows the theoretical resolution curves of perfect rectilinear images respectively with 40° half field of view at 100 and with 70° half field of view at 150, corresponding to a full field of view of respectively 80° and 140°. Most narrow angle imaging lens, having a full field of view under 60°, designed for use in photography applications target to have as low as possible image distortion by following as much as possible a rectilinear image projection. In a rectilinear lens, the relationship between the image height H on the image sensor and the half field of view angle θ in the object plane follow as closely as possible the equation $H=f^*\tan(\theta)$. This projection is usually followed by narrow-angle lens having a full field of view under 60°. However, wide-angle lenses, also called panoramic lenses, having a full field of view greater than 60°, do not usually follow this $H=f^*\tan(\theta)$ equation exactly. An image that follow perfectly this $H=f^*\tan(\theta)$ equation, either directly from capturing on an image sensor the image from the imaging lens or after any hardware or software distortion correction or dewarping, is said to have no image distortion. Any departure from this equation is called image distortion, geometrical distortion or optical distortion and is usually avoided in photography. Departure from this equation is also related to TV distortion, in which the corners of a rectangular objects appear expended or compressed in the image instead of perfectly rectangular. The graphs 100 and 150 show the resolution curves as a function of the half field of view. The resolution curve is obtained from the taking the mathematical derivative of the position curve as a function of the half field of view angle θ. On the graph 100 for the case of a full field of view of 80°, the value 110 represents the magnification of 1× in the center of the field of view, at a half field of view angle θ of 0°. Alternatively, instead of calculating the resolution as a ratio of magnification with respect to the center, it could also be calculated in mm/degree, in mm/radian, in pixels/degree or in pixels/radian, or the likes. The value of pixels/degree is especially useful when the image sensor consists of pixels of constant dimension as it is most often the case. For a half field of view θ value of 40°, the resolution value 112 is 1.7× larger than the resolution in the center 110 for the theoretical rectilinear projection and the resulting images already appear stretched. On the graph 150 for the case of a full field of view of 140°, the value 160 represents the magnification of 1× in the center of the field of view, at a half field of view angle θ of 0°. For a half field of view θ value of 45°, the resolution value 162 is 2× larger than the resolution in the center 160 for the theoretical rectilinear projection and the resulting images appear even more stretched. For wider half field of view angle θ, the difference in resolution from the center to the edge become increasingly bigger and the image become even more stretched and unpleasant for some photographic applications. For example, with the theoretical rectilinear projection, at a half field of view value of 60°, the resolution 164 is 4 times bigger than the resolution 160. At a half field of view value of 70°, the resolution 166 is 8.55 times bigger than the resolution 160. At larger half field of view value, the resolution keeps increasing until reaching infinity at a half field of view angle of 90°.

Figure 2:
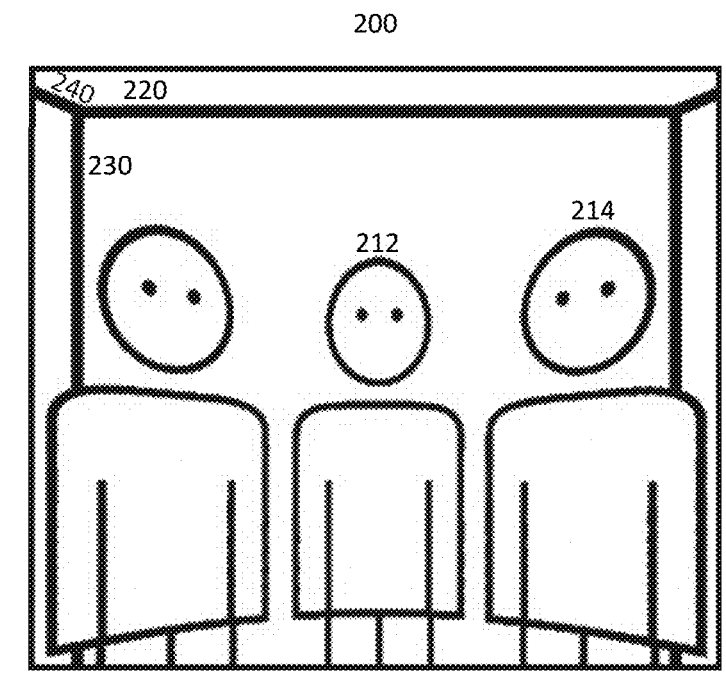
FIG. 2 shows how existing wide-angle cameras with no or small departure from rectilinear projection create visually unpleasing views.
Figure 2:
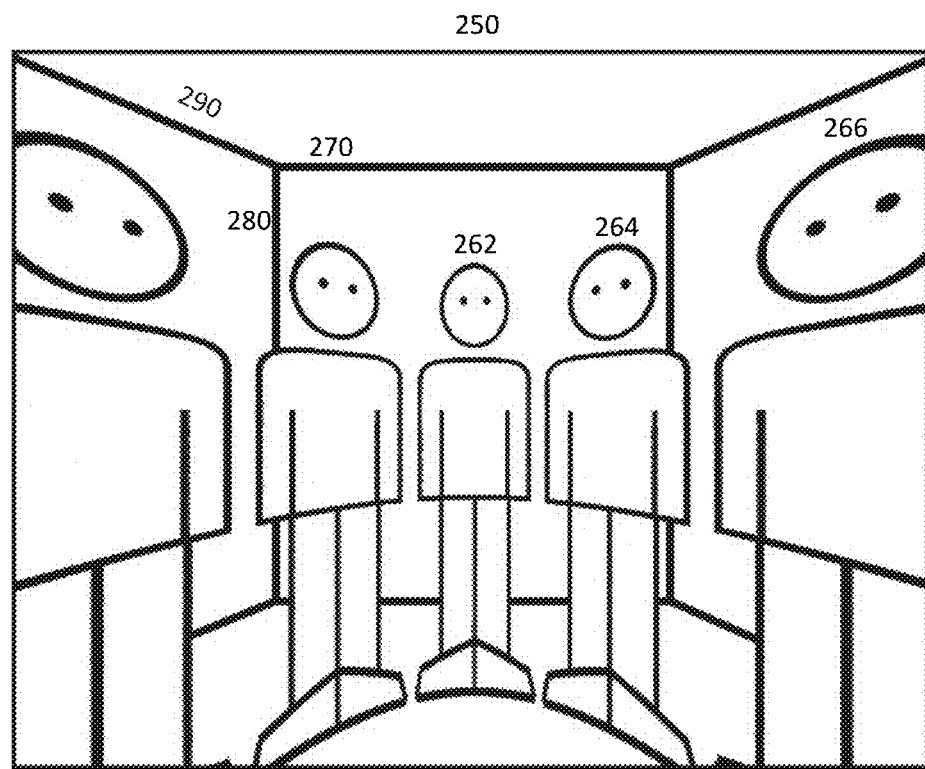

FIG. 2 shows example images of a group selfie, or groupie, as it would appear either when captured by a theoretically perfect rectilinear lens or after hardware or software correction of the image distortion to get an image with a perfect rectilinear projection. In example image 200, the full field of view in the diagonal direction of the image is 80° while in example image 250, the full field of view in the diagonal direction of the image is 140°. In the example image 200 with 80° diagonal field of view, we can see that the person with its head 212 in the center of the image appears normal because in the central area of the image, the resolution is almost constant. However, for the person 214 having its head toward the edges, the face is stretched in a direction away from the center and it looks deformed. This phenomenon of rectilinear projection is visually not pleasing for consumer photography applications, but this stretching is required to keep the lines in the object scene to appear straight as in horizonal line 220, vertical line 230 or vanishing line 240. Similarly, in the example image 250 with 140° diagonal field of view, we can see that the person with its head 262 in the center of the image appears normal because in the central area of the image, the resolution is almost constant. However, for the person 264 having its head toward the edges, the face is stretched in a direction away from the center and it looks deformed. For the person 266 having its head at a half field of view angle closer to the corner of this stretching is even more visible. Again, this phenomenon of rectilinear projection is visually not pleasing for consumer photography applications, but this stretching is required to keep the lines in the object scene to appear straight as in horizonal line 270, vertical line 280 or vanishing line 290.

Figure 3:
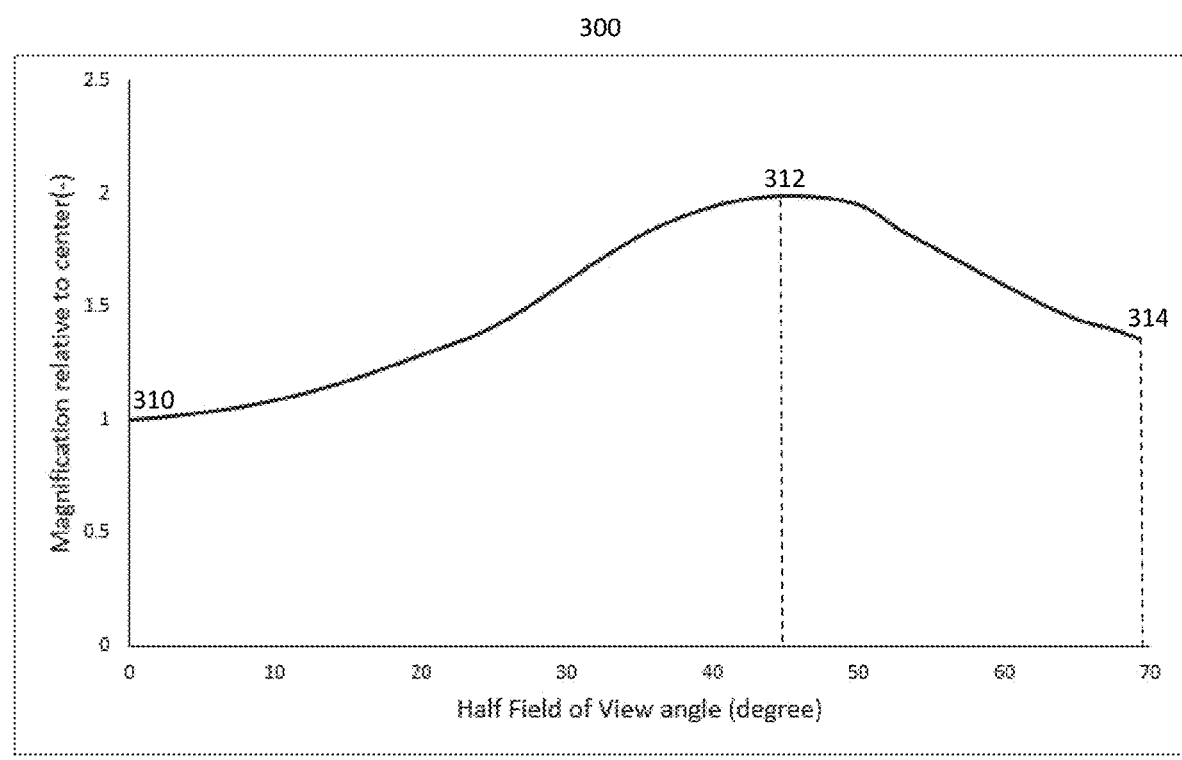
FIG. 3 shows the resolution curve of an image from a wide-angle camera with departure from rectilinear projection.

FIG. 3 shows the resolution curve of a more pleasing wide-angle image, either obtained directly from a wide-angle lens having a drop of resolution toward the edges after having a maximum value in a region between the center and the edge or obtained after modifying on purpose the image distortion with hardware or software dewarping or correction algorithm to avoid the undesirable effect of FIG. 2. This resolution curve 300 having compressed zones in the center and at the edge of the field of view and an expended zone in an intermediate zone of the image located between the center and the edges of the image is only an example resolution curve creating more visually appealing images, but other resolution curves creating more visually appealing images exist. This kind of resolution curve 300 having a given value of resolution 310 in the center, increasing smoothly up to a maximum 312 and then dropping back to an edge value 314 is typical of some wide-angle lenses or ultra-wide-angle lenses creating an expended zone in an intermediate zone of the half field of view and a compressed zone at the edge to have an image visually pleasing. In this example, the maximum resolution is around a half field of view angle θ of 45°, having a magnification value of approximately 2× as was the case with the rectilinear curve of FIG. 1, but many similar resolution curves with different maximum magnification value and location could be used to create an image more visually pleasing. Also, in this example, the average magnification value is about 1.5×, which would also be the magnification of an equidistant H=f*θ projection creating an image of the same size for the same total field of view. In this example, to create an image more visually pleasing, the magnification 310 in the center is below that average value, the magnification 312 at the maximum magnification is above this average value and the magnification 314 at the edge of the field of view is below this average magnification value. However, in some other embodiments according to the present invention, the magnification 314 at the edge of the field of view could also be above the average magnification value.

Figure 4:
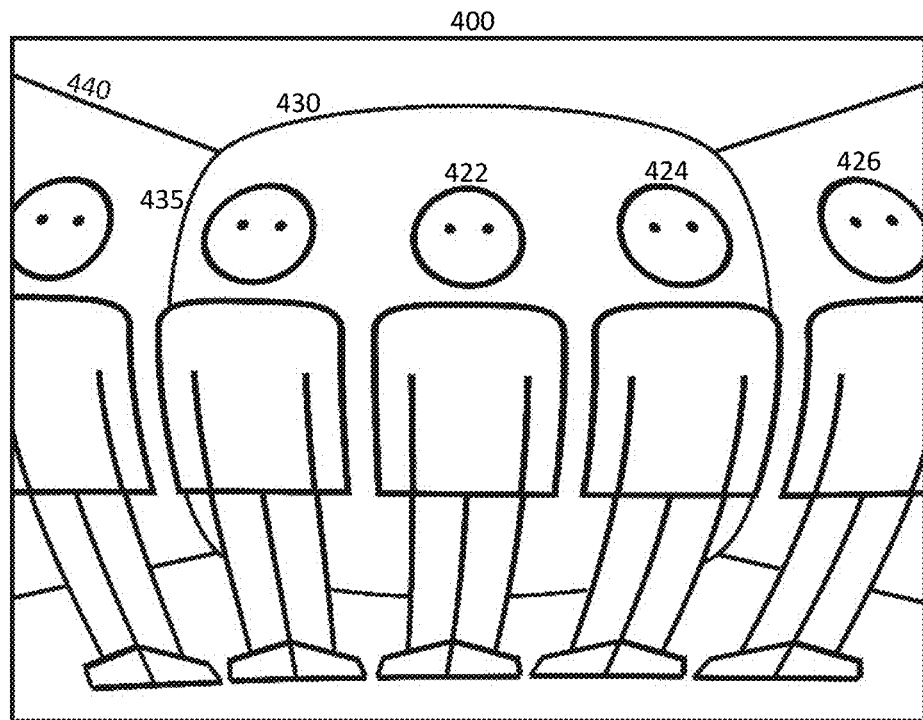
FIG. 4 shows how existing wide-angle cameras with large departure from rectilinear projection also create visually unpleasing views.
Figure 4:
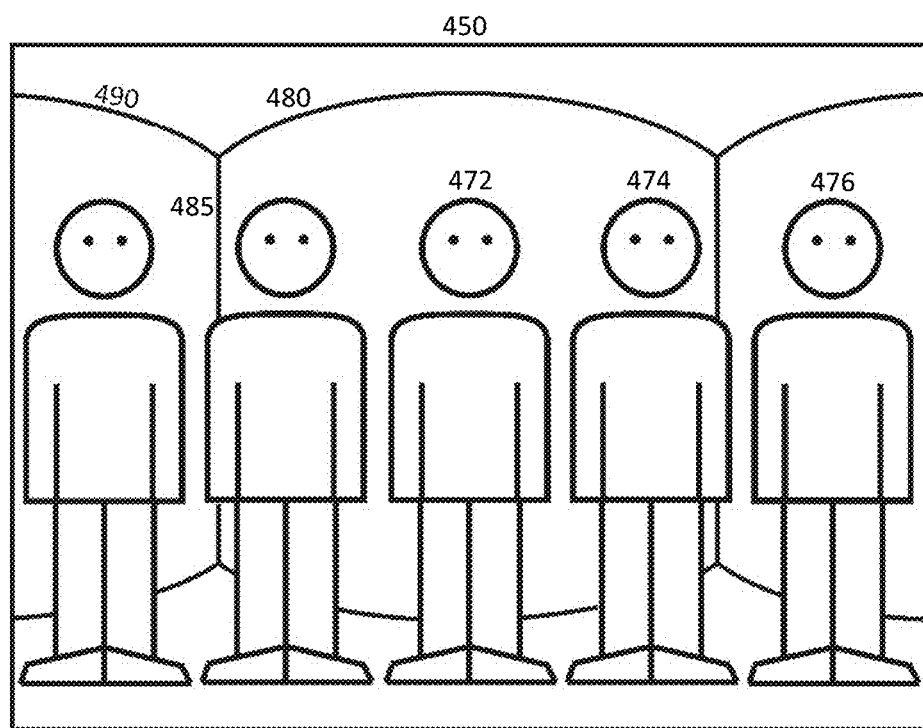

FIG. 4 shows two example images 400 and 450 of a group selfie, or groupie, as it would appear respectively when captured by a lens having a resolution curve like the one of FIG. 3 and after image warping correction to a proportion saving projection, also called body and face protection, in order to avoid or minimize the undesirable effect of FIG. 2. In the top image 400, the head of the person standing in the center 422 still appears normal. The head of the people 424 and 426 standing at respectively at half field of view angle of 45° and 70° also appears more normal than in FIG. 2 because the selected projection having the resolution curve of FIG. 3 does not have a large increase of resolution toward the edge as it was the case with the curve of FIG. 1. This result for the face is visually more pleasing in photography. However, because the lens does not follow the rectilinear projection mapping equation H=f*tan(θ), there is geometrical distortion in the image and the straight lines in the object scene do not appear straight in the image, as seen with the curved horizontal line 430 and vertical line 435. However, in this example, the vanishing lines 440 remain straight since they are oriented in the radial direction from the center of the image. In the bottom image 450, an additional image processing was done to get an image with a perfect proportion saving projection, also called face and body protection. With this projection, the head of the people 472, 474 and 476, standing respectively in the center, at a half field of view angle of 45° and at a half field of view angle of 70°, all have similar proportions because of the body and face protection correction, which is also visually pleasing for a group selfie picture. However, because this face protection projection keeping the proportions does not follow the rectilinear projection mapping equation H=f*tan(θ), there is geometrical distortion in the image and the straight lines in the objects does not appears straight in the image, as seen with the curved horizontal line 480 and vanishing lines 490. In this example projection, the vertical lines 485 are kept straight in the images, but this is not always the case.

Figure 5:
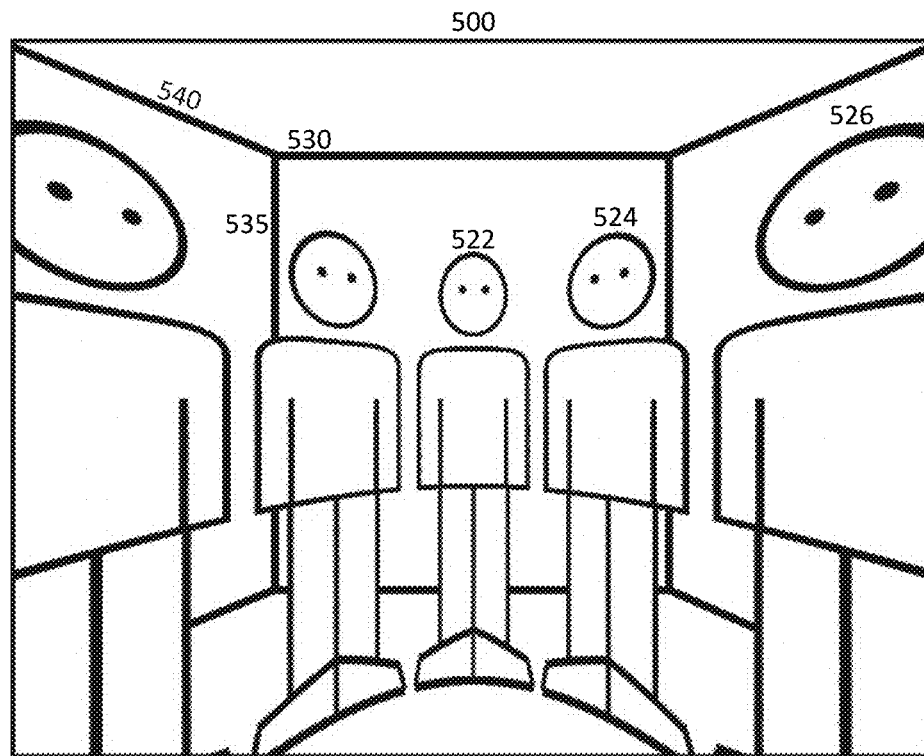
FIG. 5 shows a basic method to apply image correction to make them more visually pleasing, but while affecting the perspective.
Figure 5:
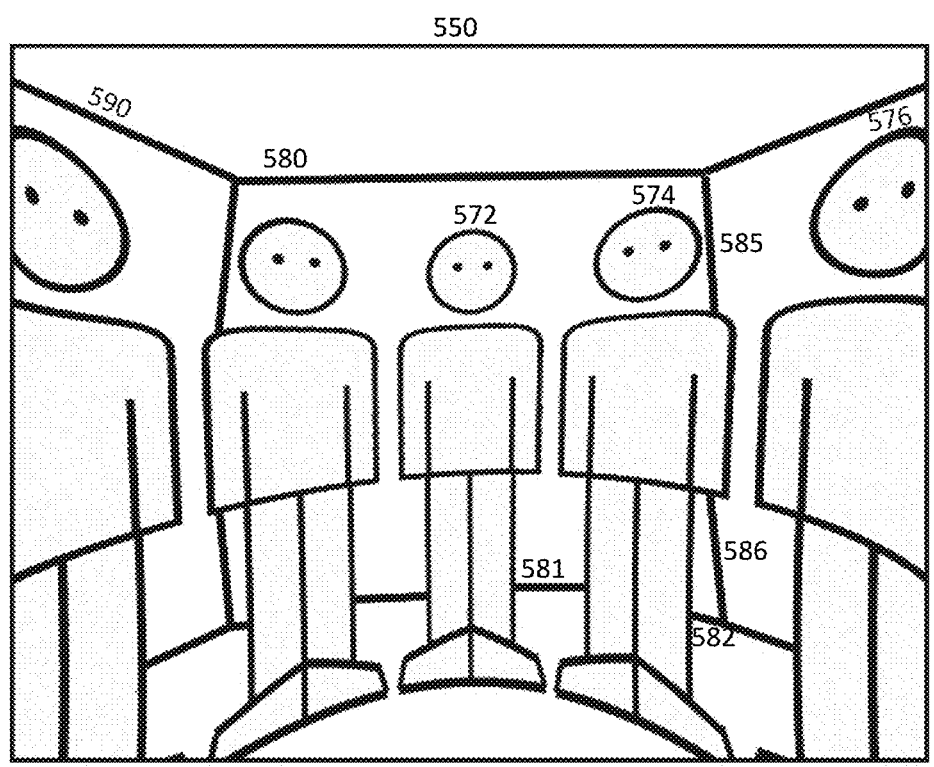

FIG. 5 shows a simple method according to the present invention in order to keep the original straight lines of the object straight in the image as well as making sure that some objects like people faces are not too stretched when they are close to the edge of the image. This method allows to enhance the original wide-angle image based on the image context. In the original image 500 having a rectilinear projection, either from using a lens with H=f*tan(θ) distribution function or after correcting the distortion with image processing, the person in the center 522 appear normal and the people 524 and 526 toward the edge appears increasingly stretched. With this original image, all the horizontal, vertical and vanishing lines 530, 535 and 540 are straight. This original image 500 is like the case of FIG. 2. One simple method to improve the appearance of the image is to correct locally the shape around stretched objects like the head 524 and 526 while keeping line straight, resulting in the example image 550. The method starts by receiving an original wide-angle image having at least one element having a warped geometry. Here, a warped geometry can be of any kind, including uneven or stretched proportions, curved lines when the original object is straight, unpleasant optical distortion or any other unpleasant artefact visible in the original wide-angle image. The method then create at least one classified element by classifying from the original wide-angle image the at least one element having the warped geometry. Here, the classification of the element can be based on various methods, including, but in no way limited to, based on a shape of the at least one element, a position of the at least one element in the original wide-angle image, a depth of the at least one element compared other elements in the original wide-angle image or the likes. The method then allows to create a final image by processing the original wide-angle image to dewarp the warped geometries. This type of processing with correction algorithm can be done by an A.I. algorithm using deep learning to correct the shape of objects or a traditional image morphing algorithm that correct the unpleasing shape by knowing its position in the image and the resolution curve creating it. In this final image, the correction is on the whole image without differentiating the front layer from the background. The correction can be done by transforming either the texture mesh or the display mesh. Alternatively, the correction can also be done by dewarping the image pixel by pixel. Corrections to the images make the people toward the edge 574 and 576 to appear more normal like the person standing in the center 572, that is body and face protection was applied. However, because of the local morphing being applied to the whole image, the undesired result from correcting the foreground is breaking the perspective in the background. In this example, the straight lines that are not touching or hidden by a foreground object remain straight like the lines 580 and 590. This is not the case of the straight lines hidden behind a foreground object like the people 574 or 576. The lines, which are continuous in the real object scene and the resulting original wide-angle image, are now discontinuous in the final image because of the correction that was applied on the foreground. This is especially visible with segments of lines 581 and 582 forming a continuous horizontal line in the object space but a discontinuous line in the corrected image or with segments of lines 585 and 586 forming a continuous vertical line in the object space but a discontinuous line in the corrected image. This figure shows an example of the simple correction method based on classification and without segmented layers, but the method is not limited to people and could be applied to various other objects to correct their warped geometries due to the non-linear magnification in the image across the field of view.

Figure 6:
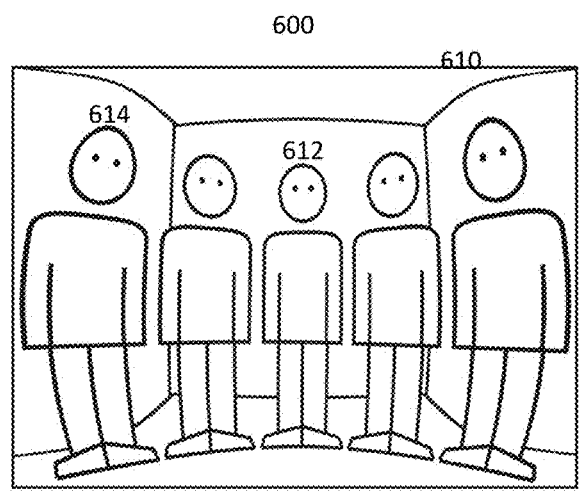
FIG. 6 shows the method for adaptive dewarping in its previous form.
Figure 6:
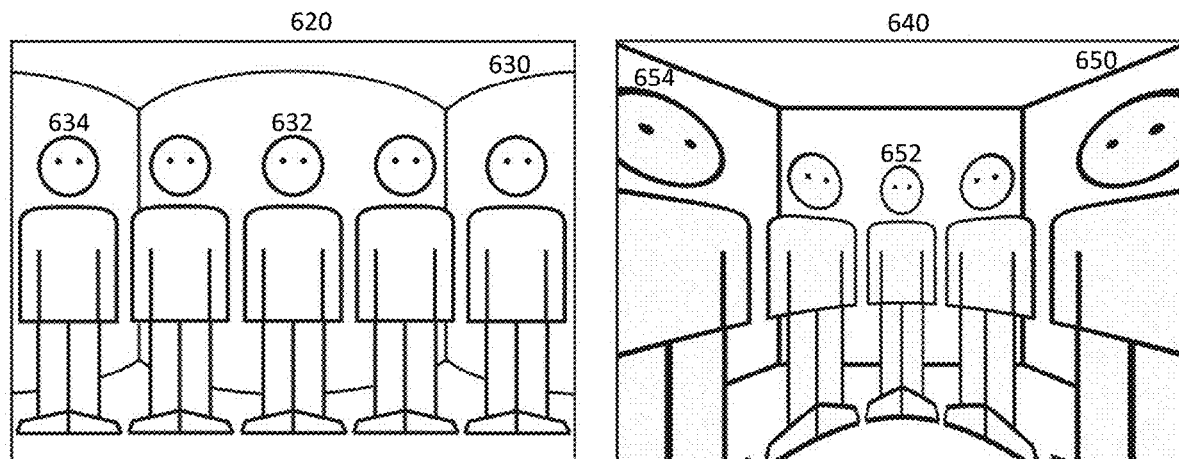
Figure 6:
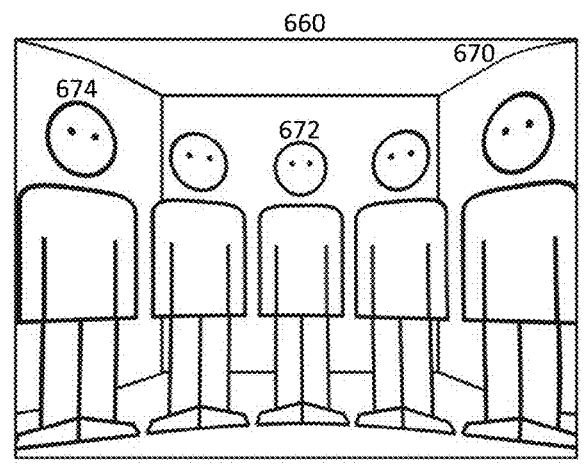

FIG. 6 shows another example of the method for adaptive dewarping based on image context in its simple form using element classification. In this example FIG. 6, an original image 600 has several warped geometries, including curved lines 610, unequal proportions between the human face as seen by the difference in size between the faces 612 in the center and 614 at the edge and the image has a diagonal field of view of 140°. This original image 600 is only an example original image, either captured directly from a wide-angle imager or after some processing has been applied, but the method according to the present invention is not limited to this scene content or to any value of diagonal full field of view. Some of the existing methods corrected completely the proportions by using a proportion saving projection. This is like in the previous example of FIG. 4, represented here by the image 620 in which the lines 630 are even more curved, but the face proportions are equal, as seen in the equal size for the face in the center 632 and the face at the edge 634. In this example, the proportion saving projection could be, but not limited to, an equirectangular projection, a cylindrical projection or any other custom projection. Some other of the existing methods straightened completely the lines in the image as in the example of FIG. 2, represented here by the image 640 in which the lines 650 are straight, but the face proportions are even worse than in the original image as seen by the larger difference in size between the face 652 in the center and the face 654 at the edge than in the original image. In both of these existing methods, conserving the original full field of view was not possible when modifying the image projection. With the method of the present invention, the simple form of the adaptive dewarping method based on image context is used to process the original wide-angle image to equally maximize the straightness of the lines in the final image compared to the original lines in the object scene, maximize the final image full field of view compared to the original wide-angle image full field of view and maximize the conservation of the proportions in the final image compared to the real proportions in the object scene. Again, the method starts by receiving an original wide-angle image with elements having warped geometries. The method then create at least one classified element by classifying from the original wide-angle image the at least one element having the warped geometry. Here, the classification of the element can be based on various methods, including, but in no way limited to, based on a shape of the at least one element, a position of the at least one element in the original wide-angle image, a depth of the at least one element compared other elements in the original wide-angle image or the likes. The method then allows to create a final image by processing the original wide-angle image to dewarp the warped geometries and maximize the field of view of the final image. The correction can be done by transforming either the texture mesh or the display mesh. Alternatively, the correction can also be done by dewarping the image pixel by pixel. The resulting image 660 has lines 670 that are straighter than in the original image 600, but less than in the image 640. The resulting image 660 also has face proportions more equal than in the original image 600, but less than in the image 620 as seen by comparing the ratio of the face in the center 672 to the face at the edge 674. Finally, the diagonal full field of view in the image 660 is kept as close as possible to the value of 140° from the original image 600 to avoid creating a zone with no information either in the corners or on the sides of the images or having to crop the image to avoid such zone with no information. The level of ideal balance between the three items to maximize with this simple form of the adaptive dewarping method depend on which compromise is acceptable for the desired application. In some embodiment, each of the three items to maximize could be assigned an adjustable correction weight to adjust the level of processing done on the original wide-angle image. These adjustable correction weights are either pre-defined for example by the requirement of the application or selected by the user according to its preference. Depending on the input original image content, the context and the application, the level to which the straightening of the curved lines, the conservation of the field of view and the conservation of the object proportion which is applied can vary according to the simple form of the method for adaptive dewarping according to the present invention. In some embodiments, the processing step of the method could be done by an artificial intelligence algorithm.

Figure 7:
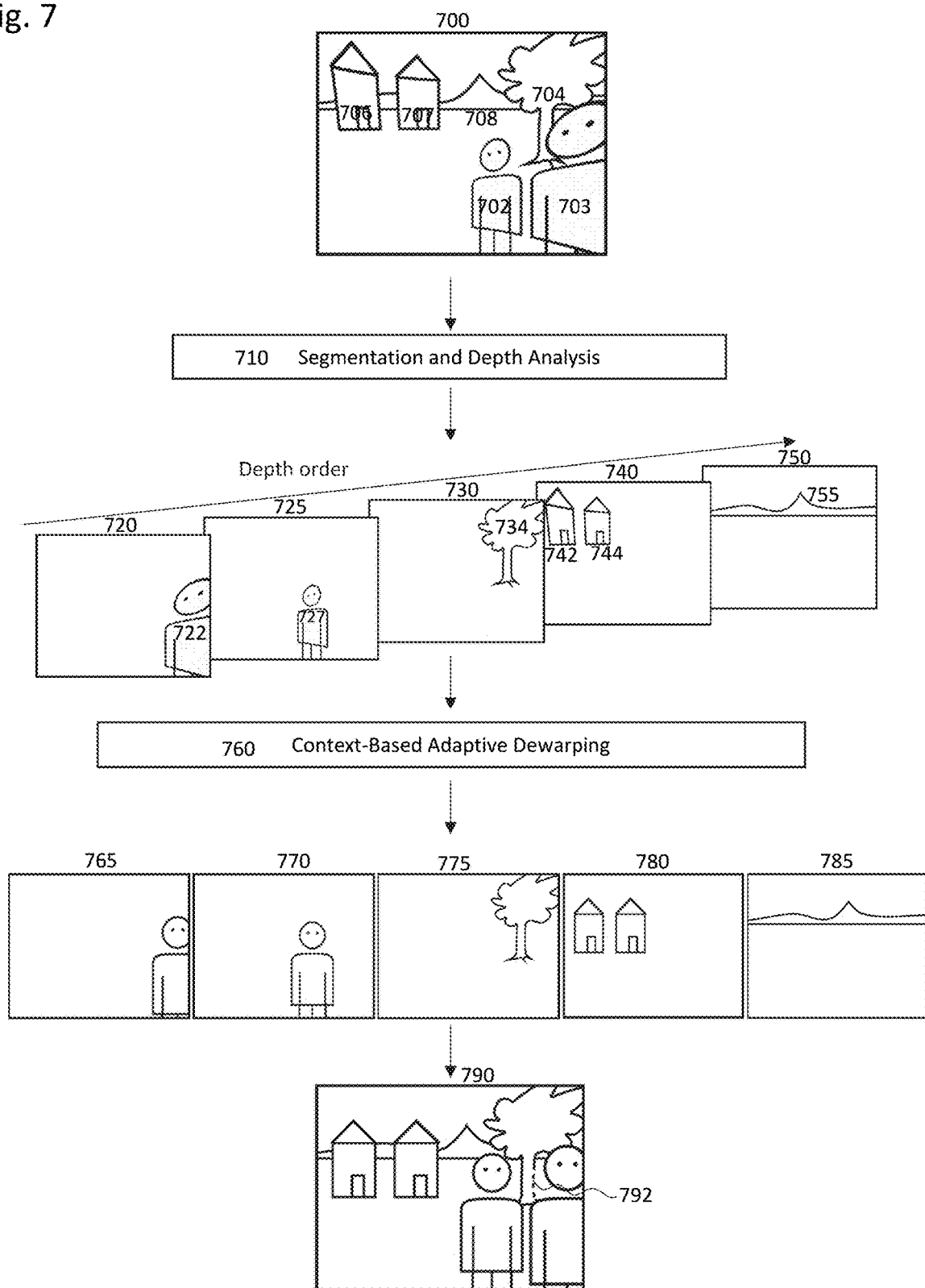
FIG. 7 shows the method for adaptive dewarping based on context segmentation and depth layers.

FIG. 7 shows the preferred method according to the present invention for adaptive dewarping based on image context segmentation and segmentation layers. The method receives as an input an original wide-angle image 700 having a plurality of elements, each element being in one of a foreground or a background of the original wide-angle image, one or more of the elements having a warped geometry. These warped geometries can be of any kind, including uneven or stretched proportions, curved lines when the original object is straight, unpleasant optical distortion or any other unpleasant artefact visible in the original wide-angle image. This wide-angle image can be of any field of view, but generally the unpleasant effects shown in FIG. 2 and FIG. 4 are mostly visible in wide-angle images with over 60° of full field of view. In a preferred embodiment according to the present invention, this original wide-angle image 700 is directly captured by an imager having an optical system comprising at least a camera module and a wide-angle optical lens with or without departure from the rectilinear projection. This wide-angle lens generally has a diagonal field of view of at least 60°. In other embodiments, this optical system consists of any combination of refractive lens element, reflective mirror element, diffractive element, meta-surface, or any other optical element helping to form an image in the image plane of the camera. In some other embodiments according to the present invention, the original image 700 has already been processed by a processor to either correct the original distortion from the camera module, improve the image quality or applying any other image processing. Alternatively, the original wide-angle image 700 could be created inside a imager with a processor from combining multiple narrow-angle images or completely computer-generated. The original wide-angle image 700 has elements that are visually unpleasant for a human observer. In this example figure, in no way limiting the scope of the present invention, the elements are a human 702 in the center that appears normal, a human 703 at the edge with a face unpleasantly stretched, a tree 704 at the edge that is deformed, a building 706 on the edge that even if it is straight in the object scene, it appears curved due to image distortion, a building 707 which appears normally straight because of its position in the center and a background 708 consisting of various far away objects as mountains or the Sun. After receiving the original wide-angle image, the method follows with the object segmentation and depth analyzing step 710 based on element depth and image context. This first processing step to segment the original wide-angle image into a plurality of segmented layers is done via a software algorithm, a hardware algorithm or an artificial intelligence algorithm trained or not via a neural network. This first processing step could be executed inside a processor, a CPU, a GPU, an ASIC, a FPGA or any other device configured to perform image segmentation or executing algorithms. In some embodiments, this processing step is done inside the same physical device on which the imager with the wide-angle camera module is located. In other embodiments, this processing step is done inside a different device on which the adaptive dewarping is required to improve the image. The segmentation processing step analyses the original wide-angle image content and separate its various elements in various segmented layers, each segmented layer including at least one of the elements. This segmentation can be done depending on the element classification and also optionally the depth analysis. This depth analysis step separates the various segmented layers based on distance of the various elements in the original wide-angle image. This segmentation step can also be based on the shape or the position in the image of the various elements. The depth of the elements, especially those in the foreground of the original wide-angle image, can be estimated with a depth estimation algorithm, including A.I. neural networks trained to deduce the relative depth of an element compared to other elements from a single image, an algorithm reconstructing the 3D structure of a scene from analyzing the difference between successive frames of a video sequence when the camera is voluntary or involuntary in motion combined with the gyroscope information from the device, or any other algorithm used to estimate, calculate or measure the depth of an element in the scene. When the depth estimation is done by a neural network, the network can be of any shape, including, but in no way limited to, neural network with convolution layers. The network can also consist of sub-networks or sub layers, each doing separate tasks, including, but in no way limited to, convolution, pooling (Maximum pooling, average pooling or other type of pooling), striding, padding, down-sampling, up-sampling, multi-feature fusion, rectified linear unit, concatenate, fully connected layers, flatten layers or the likes. In other embodiments of the current invention, the depth of each object can be calculated from a stereo pair of image captured from different positions in order to calculate differences due to parallax, from a time-of-flight hardware module, from structured light systems, from a LIDAR system, from a RADAR system, from a 3D capture or by any other means to estimate, measure or calculate the distance of objects visible in the image. With all the above examples of methods or systems to evaluate the depth, the resulting depth information can be either absolute or relative. In the case of relative depth, the depth does not have to be precise and it can be only an information that discriminate the relative position of each layer. One such example of a relative depth measurement, in no way limiting the possible methods to rank the depth of the layers, is the relative depth measurement based on superposition. In the image 700, the head of the person 703 partially hides the tree 704 because of the superposition, allowing the depth estimation algorithm to rank the relative depth of the tree 704 as being farther away than the person 703 even if absolute distance are not available. In some embodiments of the current invention, both the segmentation algorithm based on image context and element classification and the depth analysis are executed together, and they help each other to improve the results of their analysis. In the example of FIG. 7, the segmentation and depth analysis algorithm created five different layers based on context and depth of the objects. The context analysis can be the result from a classification algorithm performed at the same time as the segmentation algorithm. This classification algorithm is used to classify each segmented element in identified categories. In this example, the first and second layers 720 and 725 are for people. Each layer from the segmentation algorithm correspond to a predefined range of distance. For this reason, even if the two humans 702 and 703 from the original image 700 were the closest objects from the wide-angle camera, their distance from each other was greater than the predetermined minimum step and hence they form two different layers 720 and 725. In the layer 720, person 722 still appears stretched and visually unpleasing as did the person 703 in the original image 700. In the layer 725, the person 727 still appears correctly as person 702 from the original image 700. In this example, the third layer 730 comprises of unrecognized objects by the segmentation algorithm or recognized objects for which no particular adaptive dewarping is required, like the tree 734. The fourth layer 740 is for buildings in which the buildings 742 and 744 are still distorted as the buildings 706 and 707 in the original image 700. Here, the two buildings 742 and 744 from the layer 740 were considered at the same distance from the camera compared to the predetermined minimum distance step. Since they are from the same classification type and at the same depth, the segmentation and depth analysis algorithm 710 sorted them in the same layer 740. The tree 734 was also considered at the same distance than the two buildings 742 and 744, but since the segmentation algorithm found them to be from two different kinds, they are in different layers 730 and 740. Finally, the last layer 750 is the background, which consist of all objects like the mountain 755 far away in the image that will not be affected by the perspective corrections. The method then process at least one of the segmented layers to at least partially dewarp any of the one or more elements having the warped geometry, creating a dewarped layer. This is done by the adaptive dewarping 760 depending on the image context and depth of the objects in the original wide-angle image. In a preferred embodiment, the specific dewarping process to be applied on the segmented layer depend either on a position of the segmented layer in the original wide-angle image or on a classification of the elements in the segmented layers. The context of the original wide-angle image depends on these and is often determined automatically from analyzing the elements from original wide-angle image 700. In other cases, the context could as well be determined with information from the segmentation and depth from each layer obtained from the algorithm 710. Alternatively, the exact information and parameters of the adaptive dewarping to be applied could be transferred to the adaptive dewarping algorithm via metadata or a maker in the image, a user input, a selection from a list of adaptive dewarping algorithm or selected automatically according to the application. In this example, since the original image had a segmentation layer with people, a custom dewarping with body and face protection based on the context 760 specifically for people will be applied on layers 720 and 725 to get respectively the dewarped layers 765 and 770. This custom dewarping for people does not try to keep the perspective or straight lines of the objects, but rather to keep the shape of human visually pleasing no matter where they are in the field of view. Next, the custom dewarping for unknown or unrecognized objects is applied to layer 730 to get dewarped layer 775. This custom dewarping improve the shape of objects toward the edge of the image as if they were imaged in the center of the image based on the difference of magnification from one edge to the other edge of the object, but without specific correction as for known objects that require a specific correction (building, people). Next, the adaptive dewarping is applied on the layer 740 to get the dewarped view of the building 780. For buildings, it is important for the image to be visually pleasant to keep straight lines and hence the projection applied on this layer keeps the lines straight. Finally, the background layer 750 can also optionally be dewarped if required to get the desired projection, obtaining the dewarped layer 785. The last step of the method according to the present invention is to merge the at least one dewarped layer with the other segmented layers back together to form a final image 790 via a merging algorithm. In this example, the first layer of the final image is the background and then all the layer in decreasing order of distance from the camera as calculated by the depth analysis algorithm 710 are superposed to form the full image 790 with adaptive dewarping. In some embodiments according to the present invention, the merging of the at least one dewarped layer with the other layers is done by adjusting either the texture mesh or the display mesh. Alternatively, the merging can also be done pixel by pixel. As can be seen in this example figure, this merged final image 790 has some dashed part 792 on the tree where no information was originally captured by the camera. The correction of these regions without information will be explained with FIG. 8. This missing information is present in this example, but in some other examples according to the present invention, if the layers on top were increased in size by the adaptive dewarping algorithm, there could be an output images without any missing background information as will be explained with FIG. 9. Also, in some embodiments according to the present invention, at least one of the multiple layers after adaptive dewarping based on image context could be further processed before merging them together. One example is when the processing step further include adding some voluntary blur on at least one of the depth layers in order to add a bokeh effect depending on context and depth instead of the traditional bokeh effect only based on depth. For example, in the context of an image of a human face in front of a distant background, this context-based bokeh effect could be added automatically to blur the background and keep the human face well focused. In other applications of the current invention, when the background is more important than the foreground, the opposite could also be done, with the background in clear focus and the foreground objects blurred for inverted bokeh effect. Also, in some embodiments according to the present invention, the multiple segmented layers after adaptive dewarping based on context could be further processed before merging them together, adding on-purpose some translations, some rotation or some scaling to at least one of the dewarped layers to create voluntary perspective or 3D effects. Also, in some other embodiments according to the present invention, the further processing of the multiple segmented layers before merging them together could also include a perspective tilt correction of at least one element in a segmented layer in order to correct the perspective with respect either to the horizon or any target direction in the scene. This perspective tilt correction is especially useful when the element is a building captured with an unpleasantly looking tilt angle in the original wide-angle image to correct its shape to appears as if it was captured without this tilt angle, but could be applied to any kind of element. Also, in some other embodiments according to the present invention, the further processing of the multiple segmented layers before merging them together could also include a stabilizing at least one segmented layer in order to avoid unpleasant movement of one or more segmentation layers between frames in a video sequence. Also, in some embodiments of the method of the present invention, some unwanted object layer could be removed before merging the layers to create the final merged image. In some embodiment according to the present invention, when more than one object are touching each other or close to each other in the original wide-angle image, like the human 703 and the tree 704 in the example of FIG. 7, a specific dewarping process of the segmented layer depends on an adjustable correction weights that can be added to the context-based adaptive dewarping. These correction weights can adapt the level of dewarping done on these objects by increasing or decreasing the level of dewarping to make sure that less important objects does not interfere with more important objects nearby. In the example of FIG. 7, the tree 704 could have a lower correction weight to avoid interfering with the dewarped layer of human 703. These correction weights can be preset in the device running the adaptive dewarping or be manually adjusted or selected according to a user preference. These correction weights can also be automatically adjusted by an algorithm, including one trained via an artificial intelligence method, the algorithm automatically interpreting the intention of the user based on how the picture is captured. This adjustment of the correction weights is especially useful when the user can see a preview of the dewarped image before capturing the image and he adjust the parameters of the camera accordingly to have a better looking final dewarped image.

Figure 8:
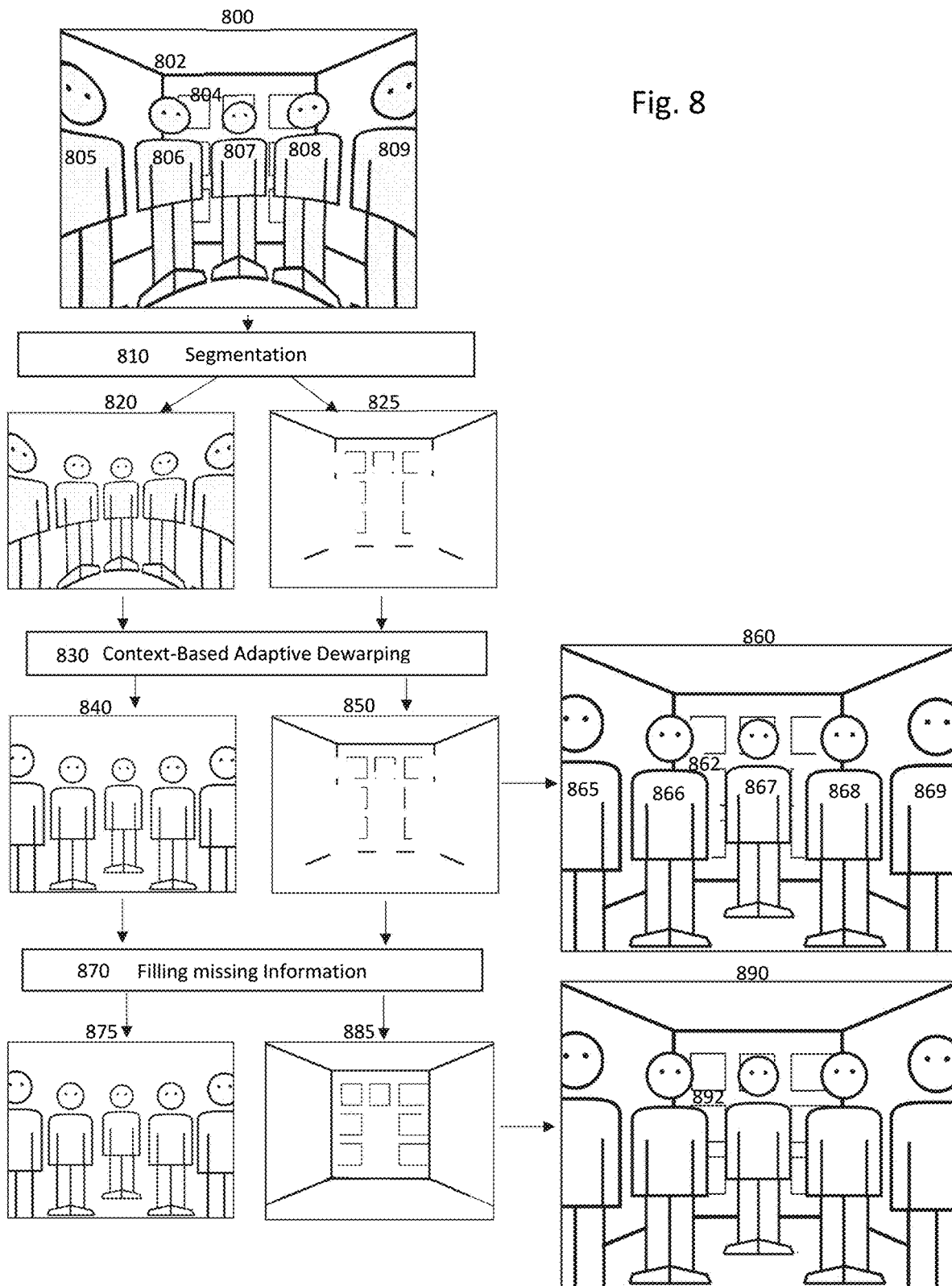
FIG. 8 shows the method for filling missing image information after the adaptive dewarping method has been applied.

FIG. 8 shows an optional method for filling missing image information during the adaptive dewarping method based on context and depth layers is applied, sometime called inpainting. This inpainting technique is used to complete at least one part of missing information in the original wide-angle image. In the possible case in which the final image of the method explained with respect to FIG. 7 has missing information, this further step allows to improve the final image to make it more visually pleasing for a human observer. The image 800 is an example original wide-angle image either from a lens with a rectilinear $H=f*\tan(\theta)$ projection or from a wide-angle lens in which the distortion has been dewarped to obtain a rectilinear projection. In this example image 800, the setting is indoor with five people in a group selfie (or groupie) setting. This image 800 is just an example, but this method to fill the missing information is not limited to any setting and could be used with any image on which the adaptive dewarping algorithm is used. The image 800 contains lines 802 from walls that were kept straight because the image follows a rectilinear projection. The image 800 also has a background wall texture 804 that is partially hidden by people 805, 806, 807, 808 and 809. As with the adaptive dewarping method of FIG. 7, the first step is the image segmentation and depth analysis step 810. For simplicity, in this example, the algorithm created two layers, one layer 820 with all the people standing at relatively the same distance from the camera and one layer 825 with the background. The segmentation and depth layer 820 has no missing information because objects are in the foreground and the segmentation and depth layer 825 has missing information because it is in the background. As with the adaptive dewarping method of FIG. 7, the next step is the context-based adaptive dewarping 830 to dewarp the warped geometries. The layer 820 has people in it and so the adaptive dewarping with body and face protection that make people shape visually appealing is used to get the dewarped layer 840. After adaptive dewarping, if the layer were merged directly together as in the method of FIG. 7, we would obtain the image with missing information 860. Compared to the original image 800, the person 867 in the center was not moved or morphed by the adaptive dewarping process and hence no zone of missing information behind it is present. However, the person 866 was moved to the left by the adaptive dewarping process and it created a zone 862 of missing information in the background. Similarly, the person 868 was moved to the right by the adaptive dewarping process and it created a zone of missing information in the background. Because they are closer to the camera, the people 865 and 869 were enlarged by the adaptive dewarping correcting the perspective compared to their respective image 805 and 809 and hence no zone of missing information was created behind them. Instead of merging layers 840 and 850, the optional additional step 870 is filling missing information with a completion algorithm or inpainting algorithm. This completion algorithm can use various methods to complete the image, including, but in no way limited to, applying a blur based on the texture and color surrounding the missing information zone, applying a gradient line that gradually change the color from the color on one side to the color on the other side of the missing information region, usually in the direction that minimize the length of these generated gradient lines, using an artificial intelligence network trained to complete the missing information of pictures or the likes. This completion algorithm can be executed on a hardware processor consisting of a processing unit (CPU or GPU) located either in the same device as the camera or in a separate device that receive the output merged image 795 according to the method of the present invention. Alternatively, the completion algorithm can also be executed in parallel to the adaptive dewarping based on context step 830. The output of the completion algorithm 870 is the completed layer 885 since layer 850 had missing information and the unmodified layer 875 since layer 840 had no missing information. The example of FIG. 8 shows one completed layer 885 because only the background had missing information, but there could be many completed layers outputted if there were many layers with missing information. The layers without missing information 875 are then merged with the completed layers 885 in order of depth from the farthest layer to the closest. The result is the final image with filled information 890 in which the perspective corrections were applied, the people shapes were corrected to avoid unpleasant stretching and the missing background information was filled with the completion algorithm compared to the image with missing information 860, obtaining a filled background 892 which is visually pleasing. In some embodiment of the present invention, the algorithm can also optionally use the information from any previous frame or even from multiples previous frames from a video sequence to complete the missing information of the current frame. This is possible when the missing information of the current frame was visible in any previous frame before some movement in the scene created the zone of missing information.

Figure 9:
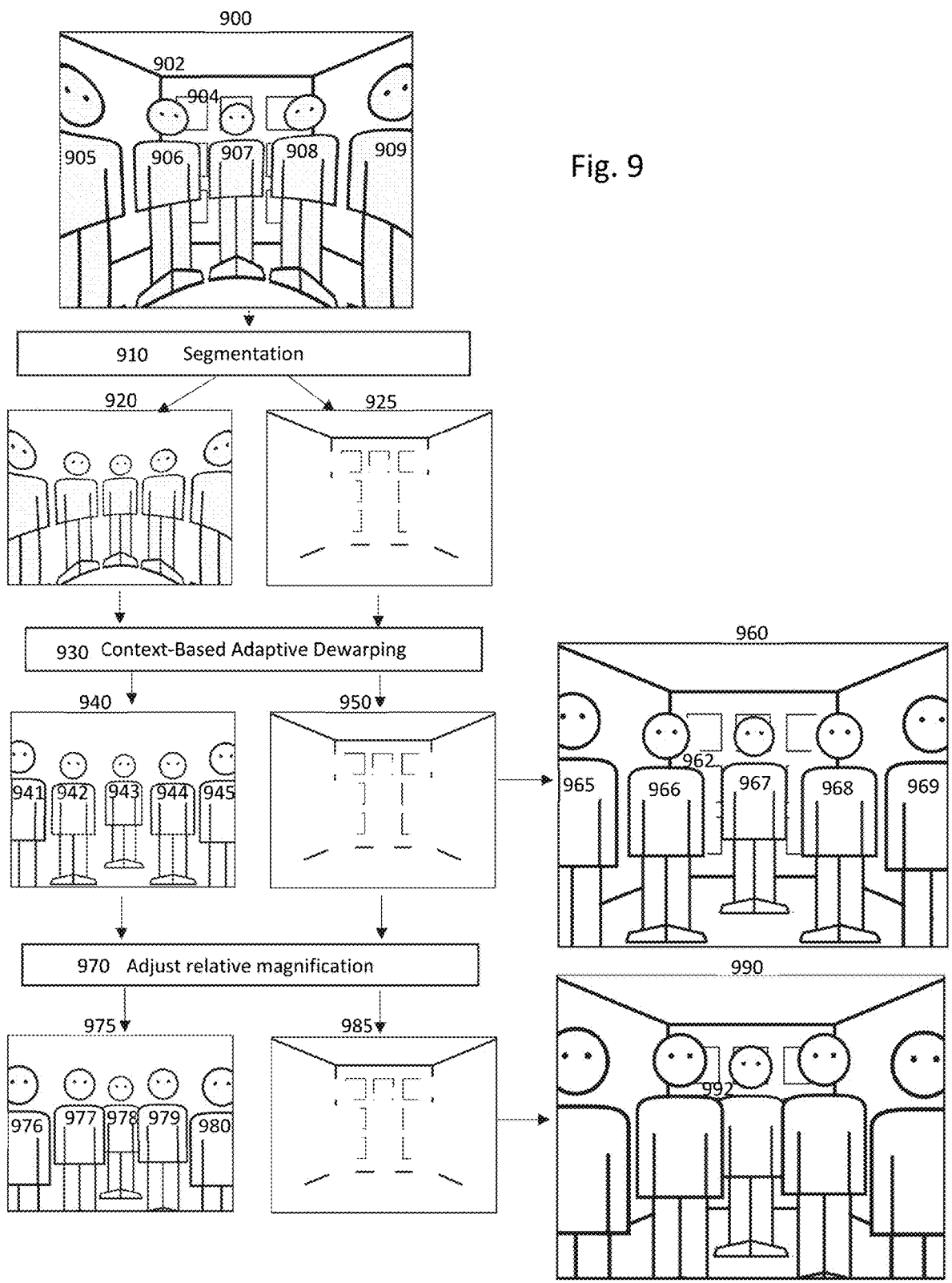
FIG. 9 shows the method for hiding missing image information after the adaptive dewarping method has been applied.

FIG. 9 shows an alternate optional method to the method of FIG. 8 for hiding instead of filling missing image information during the adaptive dewarping method based on context and depth layers is applied. With this example, at least one part of missing information in the original wide-angle image is hidden by scaling of the at least one dewarped layer In the possible case in which the output image of the method explained with respect to FIG. 7 has missing information, this alternate method allows to improve the output image to make it more visually pleasing for a human observer. Starting with the same image 900 as the image 800 from FIG. 8, this image is again an example original wide-angle image either from a lens with a rectilinear H=f*tan(θ) projection or from a wide-angle lens in which the distortion has been dewarped to obtain a rectilinear projection. In this example image 900, the setting is indoor with five people in a group selfie (or groupie) setting. This image 900 is just an example, but this method to hide the missing information is not limited to any setting and could be used with any image on which the adaptive dewarping algorithm is used. The image 900 contains lines 902 from walls that were kept straight because the image follows a rectilinear projection. The image 900 also has a background wall texture 904 that is partially hidden by people 905, 906, 907, 808 and 909. As with the adaptive dewarping method of FIG. 7, the first step is the image segmentation and depth analysis step 910. For simplicity, in this example, the algorithm created two layers, one layer 920 with all the people standing at relatively the same distance from the camera and one layer 925 with the background. The segmentation and depth layer 920 has no missing information because objects are in the foreground and the segmentation and depth layer 925 has missing information because it is in the background. As with the adaptive dewarping method of FIG. 7, the next step is the context-based adaptive dewarping 930. The layer 920 has people in it and so the adaptive dewarping with body and face protection that make people shape visually appealing is used to get the dewarped layer 940. After adaptive dewarping, if the layer were merged directly together as in the method of FIG. 7, we would obtain the image with missing information 960. Compared to the original image 900, the person 967 in the center was not moved or morphed by the adaptive dewarping process and hence no zone of missing information behind it is present. However, the person 966 was moved to the left by the adaptive dewarping process and it created a zone 962 of missing information in the background. Similarly, the person 968 was moved to the right by the adaptive dewarping process and it created a zone of missing information in the background. Because they are closer to the camera, the people 965 and 969 were enlarged by the adaptive dewarping correcting the perspective compared to their respective image 905 and 909 and hence no zone of missing information was created behind them. Instead of merging layers 940 and 950 or filling the missing information as in the method of FIG. 8, the optional additional step 970 is hiding zones of missing information with an algorithm to adjust relative magnification. This method adjusts the relative magnification of objects in the front layers and enlarges them just enough so that no zone of missing information will be present in the background when combining the layers togethers. This algorithm to adjust the relative magnification on some layers can be executed on a hardware processor consisting of a processing unit (CPU or GPU) located either in the same device as the camera or in a separate device that receive the output merged image 795 according to the method of the present invention. Alternatively, the hiding of missing information by the algorithm adjusting relative magnification can also be executed in parallel to the adaptive dewarping based on context step 930. The output of the algorithm to adjust relative magnification 970 is the magnified layer 975 since layer 940 had objects that were moved, creating zones of missing information in the merged image 960 and the unmodified layer 985 since layer 950 was in the background and no change of magnification was required. In this example, the person in the center 943 was not adjusted by the adaptive dewarping algorithm 930 and hence created no zone of missing information. For this reason, the person 978 remain unchanged in the layer 975. For the people 942 and 944 that were respectively moved to the left and to the right by the adaptive dewarping algorithm 930, they need to be magnified by the algorithm 970 to hide the zones of missing information created when they were moved and hence the people 977 and 979 in the resulting layer are enlarged. Also, in this example, the people 941 and 945 were also enlarged into respectively people 976 and 980 even if there was no zone of missing information behind them. This specific case is to show that the algorithm to adjust relative magnification 970 can even adjust objects or layers without missing information close to them in order to keep the overall proportions of the image respected. The example of FIG. 9 shows one layer with adjusted magnification 975, but there could be many layers with adjusted magnification outputted if there were many layers with objects needing enlargement to hide zones of missing information. The layers with adjusted magnification 975 are then merged with the background layers 985 in order of depth from the farthest layer to the closest. The result is the image with some foreground objects enlarged 990 in which the perspective corrections were applied, the people shapes were corrected to avoid unpleasant stretching and the missing background information was hidden by the algorithm to adjust relative magnification compared to the image with missing information 960. In the resulting image 990, there is no missing background around the area 992 compared to zone of missing information 962, which is visually pleasing.

In some other embodiment according to the present invention, both the completion method of FIG. 8 and the hiding method by adjusting relative magnification of FIG. 9 can be used together to minimize their relative impact on the image.

Figure 10:
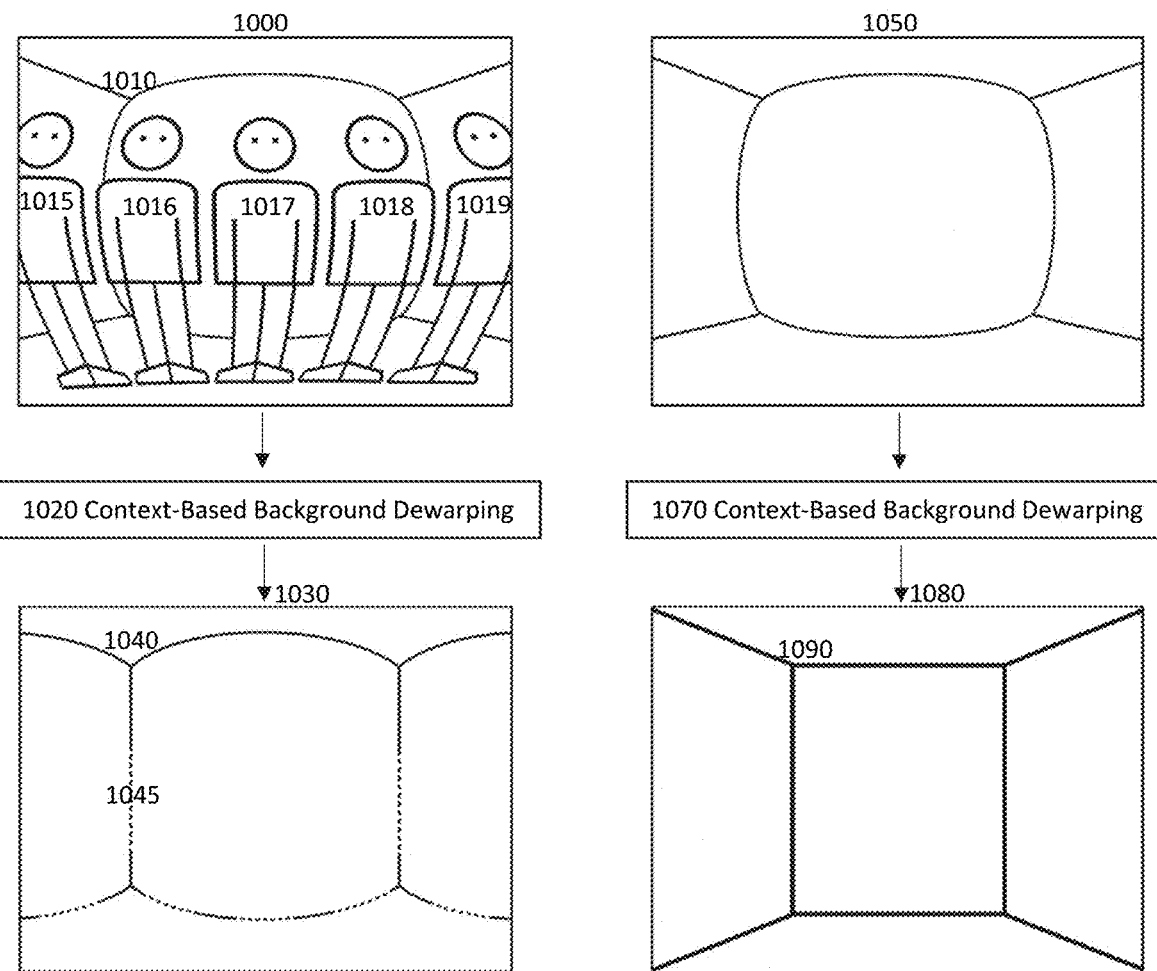
FIG. 10 shows the method in which the dewarping projection of the background layer depends on the context of the objects in the foreground.

FIG. 10 shows the method according to some embodiments of the current invention in which the dewarping projection of the background layer can depend on the detected context of the objects in the foreground. In this example, the processing of a segmented layer uses a dewarping projection for a background layer depending on a detected context of the original wide-angle image The figure shows two example images 1000 and 1050, as they would appear when captured by a lens having a resolution curve like the one of FIG. 3. Because of the distortion profile, the backgrounds lines 1010 and 1060 have visible curved lines for both the horizontal and vertical lines as explained previously at FIG. 4. For the specific example of image 1000, since there are humans 1015, 1016, 1017, 1018 and 1019 inside the picture, the algorithm 1020 for context-based background dewarping would detect that the humans are in a group selfie, or groupie, scenario and that the ideal background dewarping would be a cylindrical projection. The output of the dewarping algorithm 1020 is the background layer 1030 in which the background lines 1040 shows that vertical lines in the object are straight in the image, but horizontal lines in the object are curved in the image, as in a cylindrical projection. In the case when the background layer has some missing information because it was hidden by a foreground object, an optional inpainting technique can be used to complete the image if needed for the final output, as represented by the dashed lines 1045. Next, in the example image 1050, the same background 1060 as the previous background 1010 is visible, but this time without any human in front in the foreground. In this case, the algorithm 1070 for context-based background dewarping would detect that because it is an indoor scene, keeping straight lines in the scene as straight lines in the image is preferred and the output projection should be rectilinear. The output of the dewarping algorithm 1070 is the background layer 1080 in which the background lines 1090 are straight in the image as in a rectilinear projection. The cylindrical and rectilinear projections ideal output in this figure are only examples of background projections that could be ideal for a given context, but the method according to the present invention is not limited to any specific projection and could be any of stereographic, equidistant, equisolid, orthographic, Mercator or any other custom projection.

Figure 11:
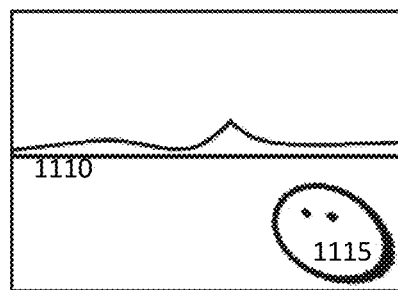
FIG. 11 shows the steps of the algorithm according to the method for context-based adaptive dewarping based on depth and segmentation layer for ideal of face protection.
Figure 11:
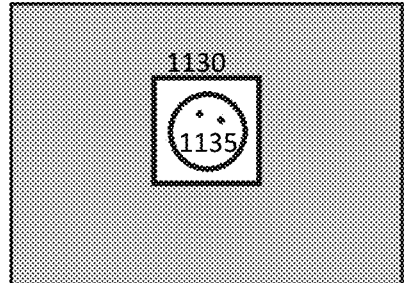
Figure 11:
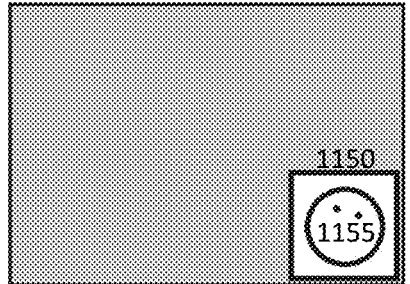
Figure 11:
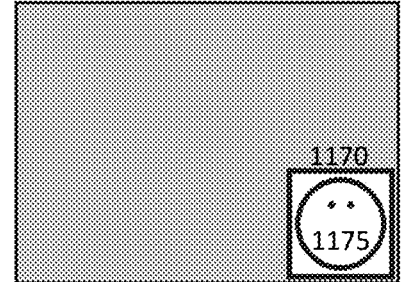
Figure 11:
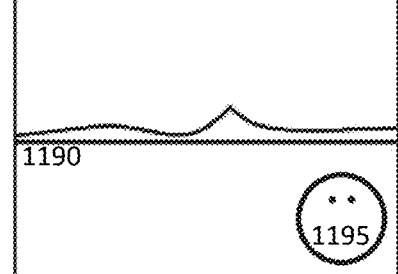

FIG. 11 shows one example implementation of the algorithm according to the method for context-based adaptive dewarping based on depth and segmentation layer for ideal face protection. In this example implementation of the algorithm, the processing of the at least one segmented layer to create the at least one dewarped layer includes creating a virtual camera centered on the element having the warped geometry, applying a rectilinear correction on the virtual camera and translating the result to a correct location in the final image. The example algorithm starts with an original wide-angle image 1100. This original wide-angle image can be of any field of view, but generally the warped geometries shown in FIG. 2 and FIG. 4 are mostly visible in wide-angle images with over 60° of full field of view. In an embodiment according to the present invention, this original wide-angle image 1100 is directly captured with a camera module having a wide-angle lens with or without departure from the rectilinear projection. In some other embodiments according to the present invention, the original image 1100 has already been processed by a processor to either correct the original distortion from the camera module, improve the image quality or applying any other image processing. Alternatively, the original wide-angle image 1100 could be combined inside a processor from multiple narrow-angle images or completely computer-generated. In this example, in no way limiting the scope of the invention, the original wide-angle image has a background 1110 consisting of a mountain landscape and a human face 1115 in the foreground as the object. Because the human face is close to the corner, the face is stretched, and the original object proportions are not kept. The original wide-angle image 1100 is not visually pleasing as already explained in FIG. 4. The context-based adaptive dewarping method does a segmentation and classification of the human face 1115. The next step 1120 in this example algorithm is creating a virtual camera 1130 with the human face 1135 centered in it. This virtual camera 1130 has a narrow field of view and is rotated as if it was in the center of the original image, fixing the stretching because in a narrow field of view in the center of the image, the original proportion are kept. This is represented by the circular head shape, representing the ideal proportion in this example. Mathematically, this example step 1120 of rotating the virtual camera, is described as follow. Each point Pin in the segmented layer of the original wide-angle image is assigned a coordinate (x,y) in the original wide-angle image.

$$Pin\begin{pmatrix}x\\y\end{pmatrix}$$

The center position of the face in the original wide-angle image is $Pin_0$, having coordinate $(x_0, y_0)$.

$$Pin_0 = \begin{pmatrix}x_0\\y_0\end{pmatrix}$$

Euler angles $(\alpha, \theta)$ are calculated from the center position $Pin_0$ according to optical distortion using a function F.

$$(\alpha, \theta) = F(Pin_0)$$

For each input point Pin, a virtual camera projection position in the 3D space $Pin_{3d}$ having coordinates (x',y',z') is calculated with a conversion function called $P_{camera}$.

$$Pin_{3d} = \begin{pmatrix}x'\\y'\\z'\end{pmatrix}$$

$$Pin_{3d} = P_{camera}(Pin)$$

Next, the rotation of the virtual camera is done in this example algorithm by multiplying a rotation matrix M which invert the Euler angles on each input point $Pin_{3d}$ in 3D space to obtain a position $Pout_{3d}$ having coordinates (u',v', w').

$$Pout_{3d} = \begin{pmatrix} u' \\ v' \\ w' \end{pmatrix}$$

$$Pout_{3d} = M(-\alpha, -\theta) * Pin_{3d}$$

This position $Pout_{3d}$ in 3D space is then converted to a position in 2D space Pout having coordinate (u,v) using an inverse function $P^{-1}_{display}$.

$$Pout = \begin{pmatrix} u \\ v \end{pmatrix}$$

$$Pout = P^{-1}_{display}(Pout_{3d})$$

The next step 1140 of this example algorithm is to translate the result from the virtual camera 1130 back to the original position in the image before the rotation of the virtual camera, giving the frame 1150 in which the human face 1155 has ideal proportions, but may still be rotated or of the wrong size for perfect match with the background. Mathematically, we use a translation vector $T=(t_x,t_y)$ to calculate the position Pout' for each point of the segmented layer.

$$Pout'=Pout+T$$

The next step 1160 of this example algorithm is optional and it includes any further processing by the adaptive dewarping algorithm of the virtual camera 1170 in order to improve the final projection of the human face 1175, including rotation, scaling or any other transformation for ideal face protection. Mathematically, we apply an optional rotation matrix R and a scale matrix S to Pout' in order to calculate a final position Pout" for each point of the segmented layer.

$$Pout"=R*S*Pout'$$

The last step 1180 of this example algorithm is merging back the segmented human face layer 1195 to the other layers, represented here by the background layer with the mountain range 1190. When the layers are merged back together, the texture mesh or the display mesh can be adjusted as desired for the best fit between the merged layers. This method for face protection was shown as an example, but the method can be applied for object protection of any kind according the present invention. The algorithm described in this FIG. 11 is only an example implementation and is not limiting. Other algorithms could be used to achieve the same result while keeping with the spirit of the invention.

Figure 12:
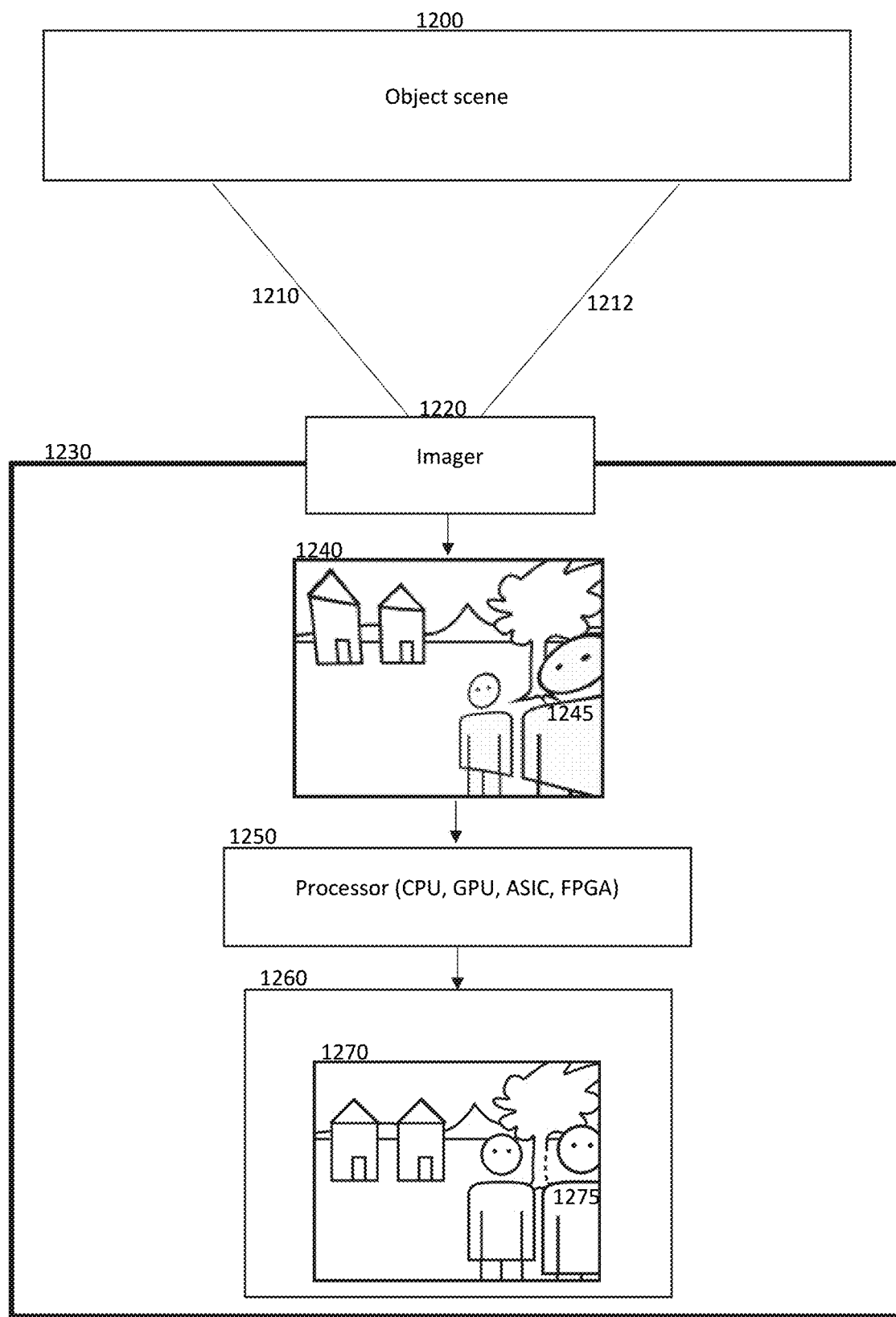
FIG. 12 shows an example embodiment of a physical device capturing the original wide-angle image, processing it and outputting the final image on a display screen.

FIG. 12 shows an example embodiment of a physical device 1230 capturing the original wide-angle image, processing it according to the method of the present invention to enhance the image based on image context and outputting the final image on a display screen. An object scene 1200 is visible to the physical device 1230, meaning that some rays of light from the object scene, here shown by the two extreme rays 1210 and 1212 defining the field of view of the imager, are reaching the imager 1220 of the physical device 1230. In this example, the imager 1220 is a wide-angle lens having a field of view generally larger than 60° and forming an optical image in an image plane with an image sensor located generally at the image plane of the wide-angle lens and transforming the rays of light from the optical image to a digital image file representing the original wide-angle image 1240. This original wide-angle image file has a plurality of elements in either the foreground or the background, with at least one element having warped geometries, visible for example by the stretched face of the person 1245. In other embodiments, the imager could consist of any other ways of creating a digital image, including other optical system with lens, mirrors, diffractive elements, meta-surfaces or the likes or any processor creating or generating a digital image file from any source. This embodiment is only an example of such a physical device according to the present invention and this example does not limit the scope of the present invention. This physical device could be any device comprising a way to receive an original wide-angle image 1240, process it and display it, like a smartphone, a tablet, a laptop or desktop personal computer, a portable camera, or the likes. In this example, the physical device 1230 also comprise a processor 1250 able to execute algorithms to process the original wide-angle image 1240 to a final image, including segmentation, classification, dewarping at least partially, merging the layers, other various image quality processing and enhancement or the likes. In this example, the processor 1250 is a central processing unit (CPU), but in other embodiments, the processing could be done by any kind of processor, including a CPU, a GPU, a TPU, an ASIC, a FPGA or any other hardware processor configured to execute software algorithm for performing the stated functions or able to process digital image files. The processor 1250 then output the final image 1270 to a display 1260. The final image 1270 has dewarped geometries, visible for example by the correct proportions of the face of human 1275. In this example, the display 1260 is part of the physical device 1230, like the screen of a smartphone or the likes, but in other embodiment, the final image file alternatively could be transferred to any other device for either display or analysis by another algorithm. This example of a single physical device 1230 comprising the imager 1220, the processor 1250 and the display 1260 is just an example embodiment according to the present invention, but these three features could also be part of multiple physical devices with the digital image file exchanged between them via any communication link to share digital image file, including, but not limited to, a computer main bus, a hard drive, a solid-state drive, a USB drive, transferred over the air via Wi-Fi or any other way of transferring digital image file between multiple physical devices.

In some embodiments according to the present invention, the adaptive dewarping method based on segmentation and depth layers is used to either maximize the straightness of the lines in the images compared to the original lines in the object scene, maximize the output image full field of view compared to the original image full field of view and/or maximize the conservation of the proportions in the output image compared to the real proportions in the object scene. When the method is used to maximize the straightness of the lines in the images compared to the original image file, the context-based adaptive dewarping method 760 transform the various segmentation and depth layers with a priority on making the straight lines in the object scene as straight as possible in the merged image 790. When the method is used to maximize the output image full field of view compared to the original image full field of view, a special dewarping is targeted for the corners of the original image in order to make sure the output merged image diagonal full field of view is kept as close as possible to the original image diagonal full field of view. This is done in order to avoid losing information in the image by reducing the field of view forcing to crop the corners or avoid creating a black corner with no information or black sides of the output image with no information. In order to keep the field of view as close as possible between the original image and the output image, the special dewarping in the corners can ignore the segmentation or the depth layers and not apply a specific dewarping based on context in that zone in the corners of the image. The choice of not applying the specific adaptive dewarping based on context and depth layer in that zone or in another zone of the image or on a specific layer for any other reason is also possible according to the present invention. When the method is used to maximize the conservation of the proportions in the output image compared to the real proportions in the object scene, the context-based adaptive dewarping method 760 transform the various segmentation and depth layers with a priority on the proportion. In this case, the proportions in the output merged image 790 all appears similar to the proportions in the real object scene as would be required when human are visible in the image. In some embodiment according to the present invention, all three of these cases are maximized together.

In all embodiments according to the present invention, the adaptive dewarping algorithm can optionally use information from any previous frame in a video sequence to do temporal filtering. With temporal filtering, the final output from the adaptive dewarping can be smoother by removing potential artefacts that could be created from a bad interpretation of the algorithm on a specific frame by favoring the temporal consistency instead of results with large departures from the previous frames. Temporal filtering is also useful in cases where some shaking of the camera or of part of the object scene would otherwise create artefacts.

All of the above are figures and examples show the adaptive dewarping method. In all these examples, the imager, camera or lens can have any field of view, from very narrow to extremely wide-angle. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for enhancing an image frame from a video sequence containing a plurality of image frames based on image context and segmentation layers, the method comprising:
   a. receiving, by a processor, a first image frame from the video sequence created by an imager and having a plurality of elements, each element being in one of a foreground or a background of the first image frame;
   b. segmenting, by the processor, the first image frame into a plurality of segmented layers, each of the segmented layers including at least one of the elements, the segmentation being based on at least one of a shape of one or more of the elements, a position of one or more of the elements in the first image frame, or a depth of one or more of the elements compared to other elements;
   c. processing, by the processor, at least one of the segmented layers, creating at least one processed layer; and
   d. merging, by the processor, the at least one processed layer with the other segmented layers to form a final image frame,
wherein at least one of the segmenting, the processing or the merging uses information from a second image frame from the video sequence.

2. The method of claim 1, wherein the first image frame is captured by the imager, the imager being an optical system comprising at least a camera and a lens.

3. The method of claim 2 wherein the diagonal field of view of the lens is at least over 60°.

4. The method of claim 1, wherein at least one of the elements is in the foreground of the first image frame, and the segmentation of the at least one foreground element is based on the relative depth compared to other elements, the relative depth being calculated by an artificial intelligence neural network.

5. The method of claim 1, wherein the processing step further includes at least one of blurring the at least one processed layer, rotating the at least one processed layer, translating the at least one processed layer, scaling the at least one processed layer, correcting the perspective tilt of the at least one processed layer or stabilizing the at least one processed layer.

6. The method of claim 1, wherein merging the at least one processed layer with the other layers is done by adjusting either a texture or a display mesh.

7. The method of claim 1, wherein the second image frame precedes a motion of the imager and the first image frame follows the motion of the imager or the first image frame precedes a motion of the imager and the second image frame follows the motion of the imager.

8. The method of claim 1, wherein the information from the second image frame is used for stabilizing at least one segmented layer.

9. The method of claim 1, wherein the information from the second image frame is used to complete at least one part of missing information in the first image frame.

10. The method of claim 1, wherein the information from the second image frame is used to do temporal filtering.

11. A device for enhancing an image frame from a video sequence containing a plurality of image frames based on image context and segmentation layers, the device comprising:
    a. an imager creating a first image frame from the video sequence having a plurality of elements, each element being in one of a foreground or a background of the first image frame; and
    b. a processor configured to:
       i. segment the first image frame into a plurality of segmented layers, each of the segmented layers including at least one of the elements, the segmentation being based on at least one of a shape of one or more of the elements, a position of one or more of the elements in the first image frame, or a depth of one or more of the elements compared to other elements,
       ii. process at least one of the segmented layers, creating at least one processed layer, and
       iii. merge the at least one processed layer with the other segmented layers to form a final image frame,
wherein at least one of the segmenting, the processing or the merging step uses information from a second image frame from the video sequence.

12. The device of claim 9, wherein the imager is an optical system comprising at least a camera and a lens.

13. The device of claim 10 wherein the diagonal field of view of the lens is at least over 60°.

14. The device of claim 9, wherein at least one of the elements is in the foreground of the first image frame, and the segmentation of the at least one foreground element is based on the relative depth compared to other elements, the relative depth being configured to be calculated by an artificial intelligence neural network.

15. The device of claim 9, wherein the processor, in the processing step, is further configured to at least one of blur the at least one processed layer, rotate the at least one processed layer, translate the at least one processed layer, scale the at least one processed layer, correct the perspective tilt of the at least one processed layer or stabilize the at least one processed layer.

16. The device of claim 9, wherein the processor is configured to merge the at least one processed layer with the other layers by adjusting either a texture or a display mesh.

17. The device of claim 11, wherein the second image frame precedes a motion of the imager and the first image frame follows the motion of the imager or the first image frame precedes a motion of the imager and the second image frame follows the motion of the imager.

18. The device of claim 11, wherein the information from the second image frame is used for stabilizing at least one segmented layer.

19. The device of claim 11, wherein the information from the second image frame is used to complete at least one part of missing information in the original image frame.

20. The device of claim 11, wherein the information from the second image frame is used to do temporal filtering.

* * * * *